US012795435B2

(12) United States Patent
Xiong

(10) Patent No.: US 12,795,435 B2
(45) Date of Patent: Nov. 10, 2026

(54) METHOD, APPARATUS AND DEVICE FOR CONTROLLING APPLICATION, AND STORAGE MEDIUM

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 564 days.

(21) Appl. No.: 18/056,102

(22) Filed: Nov. 16, 2022

(65) Prior Publication Data

US 2023/0072714 A1 Mar. 9, 2023

Related U.S. Application Data

(63) Continuation of application No. PCT/CN2022/072071, filed on Jan. 14, 2022.

(30) Foreign Application Priority Data

Feb. 25, 2021 (CN) ......................... 202110215378.3

(51) Int. Cl.
*H04W 28/02* (2009.01)
*G06F 9/48* (2006.01)

(52) U.S. Cl.
CPC ...... *H04W 28/0268* (2013.01); *G06F 9/4881* (2013.01)

(58) Field of Classification Search
CPC . H04W 28/0268; H04W 28/10; H04W 28/24; G06F 9/4881
See application file for complete search history.

(56) References Cited

U.S. PATENT DOCUMENTS

| | | | | |
|---|---|---|---|---|
| 2015/0106513 | A1* | 4/2015 | Cha | H04L 43/0876 709/224 |
| 2017/0164238 | A1* | 6/2017 | Paredes Cabrera | H04W 28/22 |
| 2017/0303287 | A1* | 10/2017 | Yu | H04W 72/542 |
| 2017/0332282 | A1* | 11/2017 | Dao | H04L 1/0002 |
| 2019/0069199 | A1* | 2/2019 | Yan | H04W 28/0268 |
| 2019/0082356 | A1* | 3/2019 | Ode | H04M 15/66 |
| 2019/0261211 | A1* | 8/2019 | Wu | H04W 28/0268 |
| 2019/0342784 | A1* | 11/2019 | Na | H04W 28/0236 |

(Continued)

FOREIGN PATENT DOCUMENTS

| | | | |
|---|---|---|---|
| CN | 110035018 | A | 7/2019 |
| CN | 113163449 | A | 7/2021 |
| WO | 2020/139052 | A1 | 7/2020 |

OTHER PUBLICATIONS

Office Action issued Feb. 8, 2024 in Chinese Application No. 202110215378.3.

(Continued)

*Primary Examiner* — Steven Hieu D Nguyen
(74) *Attorney, Agent, or Firm* — Sughrue Mion, PLLC

(57) ABSTRACT

A method for controlling an application includes receiving, by a terminal, a changed parameter value of quality of service (QoS) notification control (QNC) of a non-guaranteed bit rate (GBR) bearer flow from a core entity, and controlling, by the terminal, the application according to the changed parameter value of QNC.

15 Claims, 19 Drawing Sheets

(56) References Cited

U.S. PATENT DOCUMENTS

| | | | | |
|---|---|---|---|---|
| 2019/0394279 | A1* | 12/2019 | Dao | H04W 48/04 |
| 2020/0112907 | A1* | 4/2020 | Dao | H04M 15/8016 |
| 2020/0162392 | A1* | 5/2020 | Mani | H04L 65/762 |
| 2020/0296221 | A1* | 9/2020 | Zhou | H04M 15/8016 |
| 2021/0075864 | A1* | 3/2021 | Sun | H04W 36/0011 |
| 2021/0153070 | A1* | 5/2021 | Velev | H04W 24/08 |
| 2021/0168079 | A1* | 6/2021 | Yu | H04L 43/0882 |
| 2021/0377810 | A1* | 12/2021 | Condoluci | H04W 28/24 |
| 2022/0022089 | A1* | 1/2022 | Zhu | H04W 56/001 |
| 2022/0386164 | A1* | 12/2022 | Lee | H04W 28/0273 |
| 2023/0070882 | A1* | 3/2023 | Youn | H04W 28/02 |
| 2023/0084094 | A1* | 3/2023 | Youn | H04W 76/27 370/331 |
| 2023/0132058 | A1* | 4/2023 | Youn | H04W 4/24 370/329 |
| 2024/0015562 | A1* | 1/2024 | Youn | H04W 24/10 |

OTHER PUBLICATIONS

Written Opinion issued Mar. 29, 2022 in International Application No. PCT/CN2022/072071.

Ericsson et al., "Solution to UC and KI on how to determine the QoS profile", SA WG2 Meeting #S2-129, S2-1810227, Oct. 15-19, 2018, pp. 1-10, Dongguan, P. R. China.

Tencent et al., "Support for Application Rate Adaptation and Explicit Congestion Notification", SA WG2 Meeting #134, S2-1907136, Jun. 14-28, 2019, Sapporo, Japan, 7 pages.

International Search Report for PCT/CN2022/072071 dated Mar. 29, 2022.

* cited by examiner

METHOD, APPARATUS AND DEVICE FOR CONTROLLING APPLICATION, AND STORAGE MEDIUM

CROSS REFERENCE TO RELATED APPLICATIONS

This application is a continuation of PCT/CN2022/072071 filed on Jan. 14, 2022 and claims priority to Chinese Patent Application No. 202110215378.3 filed on Feb. 25, 2021 in the China Intellectual Property Office, the contents of each of which being incorporated by reference herein in their entireties.

FIELD

The embodiments of the disclosure relate to the field of communications, and particularly relates to a method, apparatus and device for controlling an application, and a storage medium.

BACKGROUND

In the 5th-generation (5G) mobile communication technology, QoS control is performed in units of quality of service flows (QoS Flows).

According to bearer types, QoS flows are classified into guaranteed bit rate (GBR) QoS flows and non-guaranteed bit rate (non-GBR) QoS flows. For GBR QoS flows, the corresponding bit rate may also be guaranteed in the case of shortage of network resources; and for non-GBR QoS flows, it is necessary to withstand the requirement of reducing the rate in the case of shortage of network resources.

At present, more than 90% of service flows are non-GBR QoS flows, such as common voice and video calls and online conferences. Because the change of the radio network status often causes jammed voice and video communications, it is necessary to optimize the QoS control of non-GBR QoS flows.

SUMMARY

According to an aspect of one or more embodiments, there is provided a method for controlling an application, the method comprising receiving, by a terminal, a changed parameter value of quality of service (QoS) notification control (QNC) of a non-guaranteed bit rate (GBR) bearer flow from a core entity; and controlling, by the terminal, the application according to the changed parameter value of QNC.

According to other aspects of one or more embodiments, there is also provided an apparatus and non-transitory computer readable medium consistent with the method.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

DESCRIPTION OF EMBODIMENTS

Figure 1:
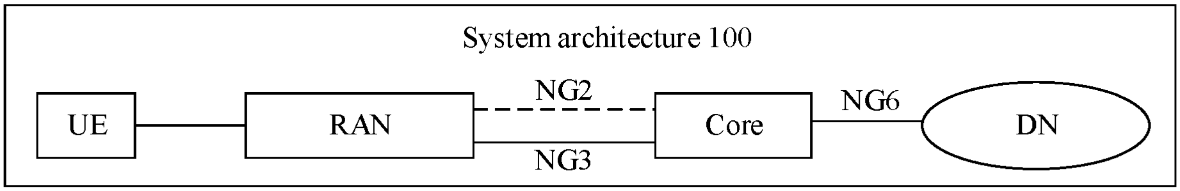
FIG. 1 shows a structural block diagram of a communication system, according to some embodiments.

To make the objectives, technical solutions, and advantages of the disclosure clearer, the following further describes the implementations of the disclosure in detail with reference to the accompanying drawings.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with the disclosure. Instead, they are merely examples of apparatuses and methods consistent with some aspects of the disclosure as recited in the appended claims.

According to some embodiments, a method, apparatus and device for controlling an application, and a storage medium, and provides a quality of service (QoS) notification control (QNC) mechanism for a non-guaranteed bit rate (GBR) QoS flow, so that a terminal senses a change of a radio network status so as to actively control the running of the application to adapt to the change. The technical solutions are as follows:

According to an aspect of the disclosure, a method for controlling an application is provided, and the method includes:

receiving, by a terminal, a changed parameter value of QNC of a non-GBR bearer flow sent by a core entity; and controlling, by the terminal, the application according to the changed parameter value of QNC.

According to another aspect of the disclosure, a method for controlling an application is provided, and the method includes:

receiving, by a core entity, a notification message sent by an access network, the notification message being used for indicating that the change of the parameter value of QNC of the non-GBR bearer flow meets a reporting condition, and the notification message carrying the changed parameter value of QNC of the non-GBR bearer flow; and sending, by the core entity, the changed parameter value of QNC to a terminal, so that the terminal controls the application according to the changed parameter value of QNC.

According to another aspect of the disclosure, an apparatus for controlling an application is provided, and the apparatus includes:

a receiving module configured to receive a changed parameter value of QNC of a non-GBR bearer flow sent by a core entity; and a control module configured to control the application according to the changed parameter value of QNC.

According to another aspect of the disclosure, an apparatus for controlling an application is provided, and the apparatus includes:

a receiving module configured to receive a notification message sent by an access network, the notification message being used for indicating that the change of the parameter value of QNC of the non-GBR bearer flow meets a reporting condition, and the notification message carrying the changed parameter value of QNC of the non-GBR bearer flow; and a sending module configured to send the changed parameter value of QNC to a terminal, so that the terminal controls the application according to the changed parameter value of QNC.

According to an aspect of the disclosure, a terminal is provided, and the terminal includes: a processor and a memory, wherein the memory stores computer programs, and the computer programs are executed by the processor to enable a network element device to implement the above-mentioned method for controlling an application.

According to another aspect of the disclosure, a network element device is provided, and the network element device includes: a processor and a memory, wherein the memory stores computer programs, and the computer programs are executed by the processor to enable the network element device to implement the above-mentioned method for controlling an application.

According to another aspect of the disclosure, a computer-readable storage medium is provided, storing a computer program, and the computer program being loaded and executed by a processor to implement the foregoing application program control method.

According to another aspect of the disclosure, a chip is provided, the chip includes a programmable logic circuit, and the programmable logic circuit implements the above-mentioned method for controlling an application during running.

According to another aspect of the disclosure, a computer program product is provided, the computer program product including computer instructions, the computer instructions being stored in a computer-readable storage medium. A processor of a computer device reads the computer instructions from the computer-readable storage medium and executes the computer instructions to cause the computer device to perform the application program control method according to the foregoing aspects.

The technical solutions provided in the embodiments of the disclosure include at least the following beneficial effects:

When the increase/decrease of the parameters of QNC of the non-GBR bearer flow meets a reporting condition, the core entity sends the changed parameter value of QNC to the terminal, and after receiving the changed parameter value of QNC, the terminal controls the application according to the changed parameter value of QNC. As a result, a QNC mechanism is provided for the non-GBR bearer flow; so that the terminal may know the change of the radio network status of the non-GBR bearer flow to actively control the running of the application to adapt to the change. For example, the computing policy and the traffic policy of the application are controlled, so that when the parameters of QNC become worse, or restore from worse to better, an application entity may adjust the application to adapt to the network transmission under the parameter change.

FIG. 1 shows a schematic architectural diagram of a communication system provided by an exemplary embodiment of the disclosure.

As shown in FIG. 1, a system architecture 100 may include: user equipment (UE), a radio access network (RAN), a Core, and a data network (DN), wherein the UE, the RAN and the Core are main components of the architecture and may be logically divided into user planes and control planes, the control planes are responsible for the management of mobile networks, and the user planes are responsible for the transmission of service data. In FIG. 1, a reference point NG2 is located between the control plane of the RAN and the control plane of the Core, a reference point NG3 is located between the user plane of the RAN and the user plane of the Core, and a reference point NG6 is located between the user plane of the Core and the DN.

UE: is a portal for mobile users to interact with networks, which may provide basic computing and storage capabilities, display service windows to users and receive user operation inputs. The UE adopts the next generation air interface technology to create a signal connection and a data connection with the RAN, thereby transmitting control signals and service data to mobile networks.

RAN: is similar to a base station in a traditional network, is deployed close to the UE, provides network access functions for authorized users in a cell coverage area, and may transmit user data by transmission tunnels of different qualities according to user levels, service requirements, etc. The RAN may manage and rationally utilize its own resources, provide access services for the UE on demand, and forward control signals and user data between the UE and the core.

Core: is responsible for maintaining the subscription data of mobile networks, managing network elements of mobile networks, and providing functions such as session management, mobility management, policy management and security authentication for the UE. The Core may provide network access authentication for the UE when the UE is attached; allocate network resources to the UE when the UE has a service request; update network resources for the UE when the UE moves; provide a quick recovery mechanism for the UE when the UE is idle; release network resources for the UE when the UE is detached; provide data routing functions for the UE when the UE has service data, such as forwarding uplink data to the DN; or receive UE downlink data from the DN, forward the data to the RAN, and then send the data to the UE.

DN: is a DN for providing business services for users. Generally, a client is located in the UE, and a server is located in the DN. The DN may be a private network, such as a local area network (LAN), or an external network, which is not controlled by operators, such as the Internet, or a proprietary network jointly deployed by operators, for example, in order to configure IP multimedia core network subsystem (IMS) services.

Figure 2:
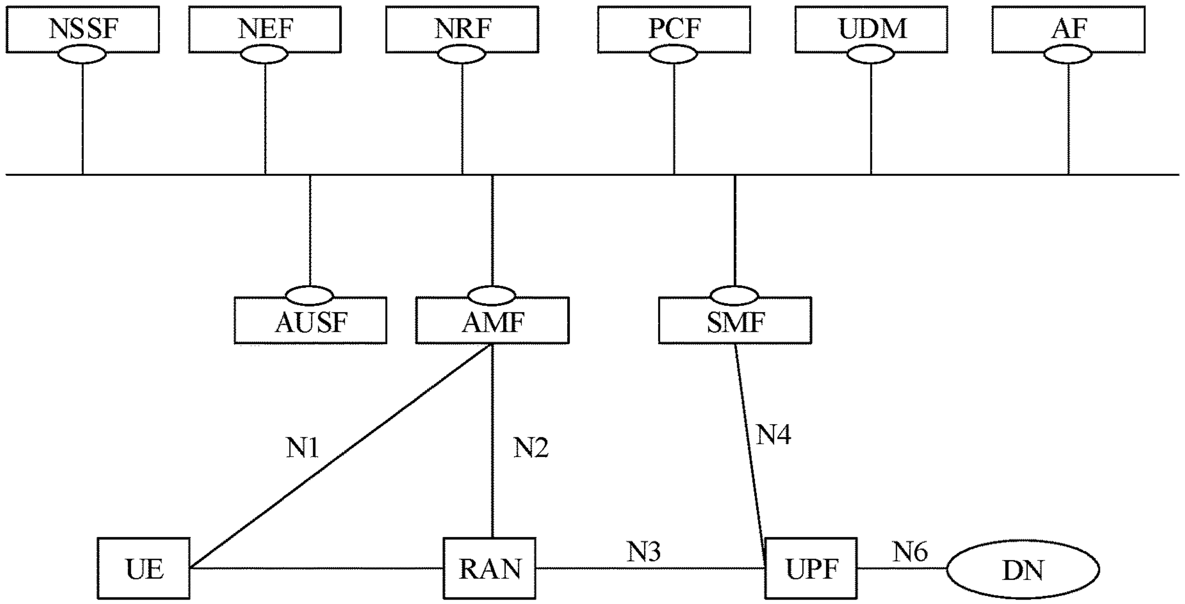
FIG. 2 shows a structural block diagram of a communication system according to some embodiments.

FIG. 2 shows a detailed architecture determined on the basis of FIG. 1, wherein the user plane of the core includes a user plane function (UPF); and the control plane of the core includes an authentication server function (AUSF), an access and mobility management function (AMF), a session management function (SMF), a network slice selection function (NSSF), a network exposure function (NEF), an NF repository function (NRF), a unified data management (UDM) function, a policy control function (PCF), and an application function (AF). The functions of these functional entities are as follows:

UPF: is used for performing user data packet forwarding according to routing rules of the SMF;

AUSF: is used for performing security authentication of the UE;

AMF: is used for performing access and mobility management of the UE;

SMF: is used for performing session management of the UE;

NSSF: is used for selecting network slices for the UE;

NEF: is used for exposing network functions to third parties in the form of an application program interface (API);

NRF: is used for providing a storage function and a selection function of network function entity information for other network elements;

UDM: is used for performing user subscription context management;

PCF: is used for performing user policy management; and

AF: is used for performing user application management.

In the architecture shown in FIG. 2, an interface N1 is a reference point between the UE and the AMF; an interface N2 is a reference point between the RAN and the AMF, and is used for sending NAS messages, etc.; an interface N3 is a reference point between the RAN and the UPF, and is used for transmitting data of user planes, etc.; an interface N4 is a reference point between the SMF and the UPF, and is used for transmitting information such as tunnel identification information connected to the N3, data buffer indication information, and downlink data notification messages; and an interface N6 is a reference point between the UPF and the DN, and is used for transmitting data of user planes, etc. Next generation (NG) interface: is an interface between a RAN and a 5G core.

It is to be understood that the name of the interface between the network elements in FIG. 1 and FIG. 2 is just an example, and the names of the interfaces in specific implementations may be other names, which are not limited in the embodiments of the disclosure. The name of each of the network elements (such as the SMF, the AF, and the UPF) included in FIG. 1 and FIG. 2 is only an example, and the functions of the network elements are not limited. In 5G and future other networks, the above-mentioned network elements may also have other names, which are not limited in the embodiments of the disclosure. For example, in a 6G network, some or all of the above-mentioned network elements may continue to use the terms in the 5G network, and may use other names, etc., which are uniformly described here and are not repeated below. In addition, the name of the message (or signaling) transmitted between the above-mentioned network elements is only an example, and the functions of the message are not limited.

In the embodiments of the disclosure, a quick-change QoS notification control (QCQNC) mechanism is defined for a non-GBR QoS flow. The QCQNC mechanism is a type of QNC, which may be referred to as QNC for short. In the QCQNC mechanism provided by the embodiments of the disclosure, when detecting that at least one QoS parameter of the non-GBR QoS flow changes quickly, the access network sends a quick-change notification to the SMF. The SMF sends the quick-change notification to the PCF, the AF and the UE. After receiving the quick-change notification, the AF and the UE adjust their internal applications to enable the applications to adapt to the change, thereby preventing the occurrence of phenomena such as jamming that affects the quality of experience (QoE).

The QoS flow is the smallest QoS differentiation granularity in a PUD session. The QoS Flow ID (QFI) is used in a 5G system to differentiate QoS flows. The QoS flow is controlled by the SMF, and the QoS flow may be preconfigured, or created in a PDU session creation process, or modified in a PDU session modification process.

In the embodiments of the disclosure, the following QoS attributes are defined for the non-GBR QoS flow:

5G QoS Identifier (5QI), Allocation and Retention Priority (ARP), and Reflective Qos Attribute (RQA).

Moreover, corresponding to the 5QI of the non-GBR QoS flow, only the following QoS attributes are defined:

Resource Type:

divided into: GBR, delay key GBR or non-GBR.

Priority Level;

Packet Delay Budget (PDB);

PDB, including packet delay of a core.

Packet Error Rate (PER).

In the 4 QoS attributes, the first two parameters Resource Type and Priority Level define the attributes of the 5QI, and the latter two parameters PDB and PER define the properties of the 5QI.

In the embodiments of the disclosure, the profile of proposed QoS QNC includes three parameters PDB, PER and current bit rate (CBR) related to a non-GBR QoS flow (NGBF). When detecting that the parameter value of any one of the three parameters increases or decreases by a changing rate (or increases or decreases by a changing value) which exceeds a specified threshold (due to different properties of different parameters, for each parameter, the corresponding changing rate or changing value is different), the RAN sends a notification message to the SMF and notifies the changing rate or changing value of all parameter changes. The SMF sends the notification message to the PCF, the PCF sends the notification message to the AF, and then, the application corresponding to the AF is correspondingly adjusted. Furthermore, the SMF sends the notification message to the UE through an NAS message, and the application corresponding to the UE may further be correspondingly adjusted, thereby realizing the interaction between the network and the application, realizing the optimization of service transmission, solving the jamming when the network is congested, and avoiding the problem that when network conditions become better, the application still uses a very low transmission rate, so that network resources may not be fully utilized, and the user experience may not be improved.

In an example embodiment, there are two definitions of parameter change:

1. Changing value:

When a parameter value changes from A to B, B-A is defined as a changing value. Assuming that the changing value when the parameter value changes from A to B is a first changing value, and the changing value when the parameter value changes from B to A is a second changing value, the first changing value and the second changing value have a same amplitude (regardless of positive or negative).

2. Changing rate:

In a possible design, when a parameter value changes from A to B, (B-A)/A is defined as a changing rate. Assuming that the changing rate when the parameter value changes from A to B is a first changing rate (B-A)/A, and the changing rate when the parameter value changes from B to A is a second changing rate (A-B)/B, the first changing rate and the second changing rate have different amplitudes (regardless of positive or negative).

That is, the amplitude of the (B-A)/A is not equal to the amplitude of the (A-B)/B (assuming that B>A>0). Therefore, in the above-mentioned definition, after the parameter value A increases by 30% to the parameter value B, the parameter value B decreases by 30% but does not return to the parameter value A.

In another possible design, in order to ensure that a parameter value which first increases by 30% and then decreases by 30% returns to the same parameter value, the changing rate is uniformly defined as (larger value-smaller value)/smaller value before and after the parameter value changes, or the changing rate is uniformly defined as (larger value-smaller value)/larger value before and after the parameter value changes, or the changing rate is uniformly defined as (larger value-smaller value)/fixed value before and after the parameter value changes, wherein the larger value is the one with a larger absolute value in the parameter values before and after the change, the smaller value is the one with a smaller absolute value in the parameter values before and after the change, and the fixed value is a predetermined value that does not change. In this way, the parameter value A which first increases by 30% and then decreases by 30% returns to the original parameter value A.

In an example embodiment, the following communication protocols are provided:

QoS profile

Whether a QoS flow is GBR or non-GBR is determined by its QoS profile. The QoS profile of the QoS flow is sent to the (R)AN, including the following QoS parameters (details of the QoS parameters are defined in subsection 5.7.2 of standard TS23.501).

For each QoS flow, the QoS profile includes the following QoS parameters:

5QI; and

ARP;

for each non-GBR QoS flow only, the QoS profile may further include the following QoS parameters:

QCQNC;

RQA;

for each GBR QoS flow only, the QoS profile may further include the following QoS parameters:

guaranteed flow bit rate (GFBR)-uplink and downlink, and maximum flow bit rate (MFBR)-uplink and downlink; and for the GBR QoS flow only, the QoS profile may further include one or more QoS parameters:

notification control;

maximum packet loss rate-uplink and downlink.

In an example embodiment, a QoS quick-change notification control profile is provided.

The QoS quick-change notification control profile is provided for the non-GBR QoS flow for enabling quick-change notification control. If the corresponding PCC rule includes relevant information (as described in the communication protocol TS 23.503), the SMF further provides the quick change notification control profile to the NG-RAN in addition to QoS profile files. If the SMF provides the quick change notification control profile to the NG-RAN (if the corresponding policy and charging control rule (PCC) information changes), the NG-RAN replaces the previously stored profile with the quick-change notification control profile.

The quick-change notification control profile represents the quick change of any of QoS parameters PDB and PER and the detected CBR, which helps the application to control the application traffic according to the changed QoS parameters. The quick change notification control profile represents the (20%, 10%, 30%) quick change (increase or decrease) of the (PDR, PER, CBR) within a short period of time, and the new value after the change may be retained continuously, that is, the quick change is not a short and fast spike caused by sudden impact interference and other reasons.

The quick-change notification control profile may be any change combination of the PDB, the PER and the CBR. For example, the quick-change notification control profile may set the increased (or decreased) PDR to 20%; or may set the increased (or decreased) PDR and PER to 20% and the increased (or decreased) CBR to 10%; or may set the increased (or decreased) CBR to 30%.

When the NG-RAN sends a quick-change notification that meets the QCQNC profile to the SMF, the NG-RAN notifies that the message includes the current QoS parameters (PDB, PER) and the CBR.

Figure 3:
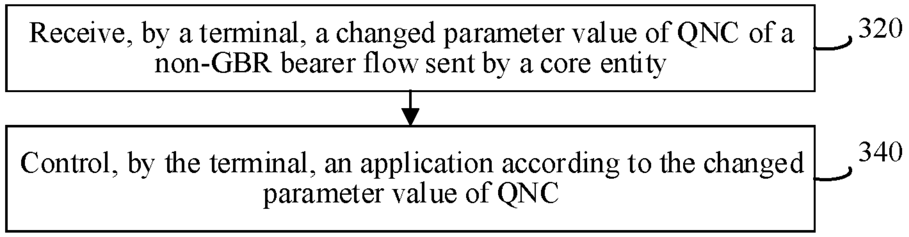
FIG. 3 shows a flowchart of a method for controlling an application according to some embodiments.

FIG. 3 is a flowchart of a method for controlling an application provided by an exemplary embodiment of the disclosure. This example embodiment is illustrated by taking the method applied to the terminal shown in FIG. 1 or FIG. 2 as an example. The method includes:

Operation 320: Receive, by a terminal, a changed parameter value of QNC of a non-GBR bearer flow sent by a core entity.

The non-GBR bearer flow refers to a non-GBR type bearer flow. The non-GBR bearer flow includes: a non-GBR QoS flow, or a non-GBR EPS bearer. Exemplarily, in the 5G system, the non-GBR bearer flow is a non-GBR type QoS flow; and in the 4G system, the non-GBR bearer flow is a non-GBR type EPS bearer.

Exemplarily, the parameter of QNC (or QCQNC) includes at least one of the following: PDB, PER, and CBR. In a case that there are at least two of the parameters of QNC, the reporting conditions corresponding to at least two of the parameters are the same; and/or the reporting conditions corresponding to at least two of parameters are different.

Exemplarily, the reporting condition (or change threshold, change reporting threshold) includes at least one of the following:

The changing value of the parameter of QNC within a first duration is greater than a first threshold.

The first threshold is a decimal greater than 0 and less than 1. For example, the first threshold is 20%, 30% and 40%. The first duration is a period or duration for computing the changing value, such as 1 second and 2 seconds.

The changing rate of the parameter of QNC within a second duration is greater than a second threshold.

The second threshold is a decimal greater than 0 and less than 1. For example, the second threshold is 20%, 30% and 40%. The second duration is a period or duration for computing the changing rate, such as 1 second and 2 seconds.

The changing value of the parameter of QNC within the first duration is greater than the first threshold, and a third threshold is retained continuously.

The third threshold is a threshold for measuring a retaining duration of the changing value, such as 2 seconds.

The changing rate of the parameter of QNC within the second duration is greater than the second threshold, and a fourth threshold is retained continuously.

The fourth threshold is a threshold for measuring a retaining duration of the changing rate, such as 2 seconds.

The changed parameter value of QNC means: a current parameter value of the parameter of QNC after the parameter of QNC changes quickly. The "current" is a relative concept, not the current in an absolute sense. For example, the current parameter value is a parameter value when a reporting condition is triggered, and is not necessarily equal to a real-time parameter value after a notification message is sent.

In some embodiments, the changed parameter value of QNC is represented by a quantized value. For example, the value range of QNC is divided into 16 non-overlapping sub-ranges. Each of the 16 sub-ranges corresponds to a unique quantized value, and the quantized value is represented by four bits. When the changed parameter value of QNC belongs to the ith sub-range, the quantized value corresponding to the ith sub-range is used, and the quantized value only needs 4 bits, so that transmission resources required for the notification message may be reduced.

The changed parameter value of QNC is sent after the core entity receives the notification message sent by the access network; and the notification message is used for indicating that the change of the parameter value of QNC of the non-GBR bearer flow meets a reporting condition.

Operation 340: Control, by the terminal, the application according to the changed parameter value of QNC.

The terminal controls at least one of the computing policy and the traffic policy of the application according to the changed parameter value of QNC, so as to enable the application to adapt to the quick change of the parameter of QNC of the non-GBR bearer flow.

One or more applications run on the terminal, and the same application corresponds to at least one service data flow (SDF). SDFs with different QoS requirements are respectively mapped to independent QoS flows. For example, an SDF with a first QoS requirement is mapped to a first QoS flow, and an SDF with a second QoS requirement is mapped to a second QoS flow. In some embodiments, SDFs with the same QoS requirements may be mapped to the same QoS flow.

In the embodiments of the disclosure, assuming that one or more QoS flows corresponding to an application include the non-GBR QoS flow, the non-GBR QoS flow is used for transmitting data packets of at least one service among voice, video, text, message, file, control information and other services.

In conclusion, according to the method of some embodiments, when the increase/decrease of the parameters of QNC of the non-GBR bearer flow meets a reporting condition, the core entity sends the changed parameter value of QNC to the terminal, and after receiving the changed parameter value of QNC, the terminal controls the application according to the changed parameter value of QNC. As a result, a QNC mechanism is provided for the non-GBR bearer flow, so that the terminal may know the change of the radio network status of the non-GBR bearer flow so as to actively control the running of the application to adapt to the change. For example, the computing policy and the traffic policy of the application are controlled, so that when the parameters of QNC become worse, or restore from worse to better, an application entity may adjust the application to adapt to the network transmission under the parameter change.

Figure 4:
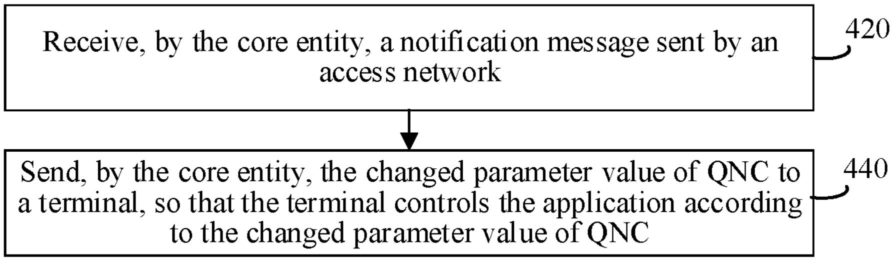
FIG. 4 shows a flowchart of a method for controlling an application according to some embodiments.

FIG. 4 is a flowchart of a method for controlling an application provided by an exemplary embodiment of the disclosure. This example embodiment is illustrated by taking the method applied to the core entity shown in FIG. 1 or FIG. 2 as an example. The method includes:

Operation 420: Receive, by the core entity, a notification message sent by an access network.

The notification message is used for indicating that the change of the parameter value of QNC of the non-GBR bearer flow meets a reporting condition, and the notification message carries the changed parameter value of QNC of the non-GBR bearer flow, that is, a current parameter value of the parameter of QNC after the parameter of QNC changes quickly. The "current" is a relative concept, not the current in an absolute sense. For example, the current parameter value is a parameter value when a reporting condition is triggered, and is not necessarily equal to a real-time parameter value after a notification message is sent.

Exemplarily, the changed parameter value of QNC may be represented by a quantized value of the changed parameter value of QNC. For example, the value range of QNC is divided into 16 non-overlapping sub-ranges. Each of the 16 sub-ranges corresponds to a unique quantized value, and the quantized value is represented by four bits. When the changed parameter value of QNC belongs to the ith sub-range, the quantized value corresponding to the ith sub-range is used, and the quantized value only needs 4 bits, so that transmission resources required for the notification message may be reduced.

Operation 440: Send, by the core entity, the changed parameter value of QNC to a terminal, so that the terminal controls the application according to the changed parameter value of QNC.

In conclusion, according to the method provided by this example embodiment, when the increase/decrease of the parameters of QNC of the non-GBR bearer flow meets a reporting condition, the core entity sends the changed parameter value of QNC to the terminal, and after receiving the changed parameter value of QNC, the terminal controls the application according to the changed parameter value of QNC. For example, the computing policy and the traffic policy of the application are controlled, so that when the parameters of QNC become worse, or restore from worse to better, the terminal may adjust its own internal applications to adapt to the parameter change, thereby optimizing the running of the application and reducing the occurrence of jammed phenomena.

Figure 5:
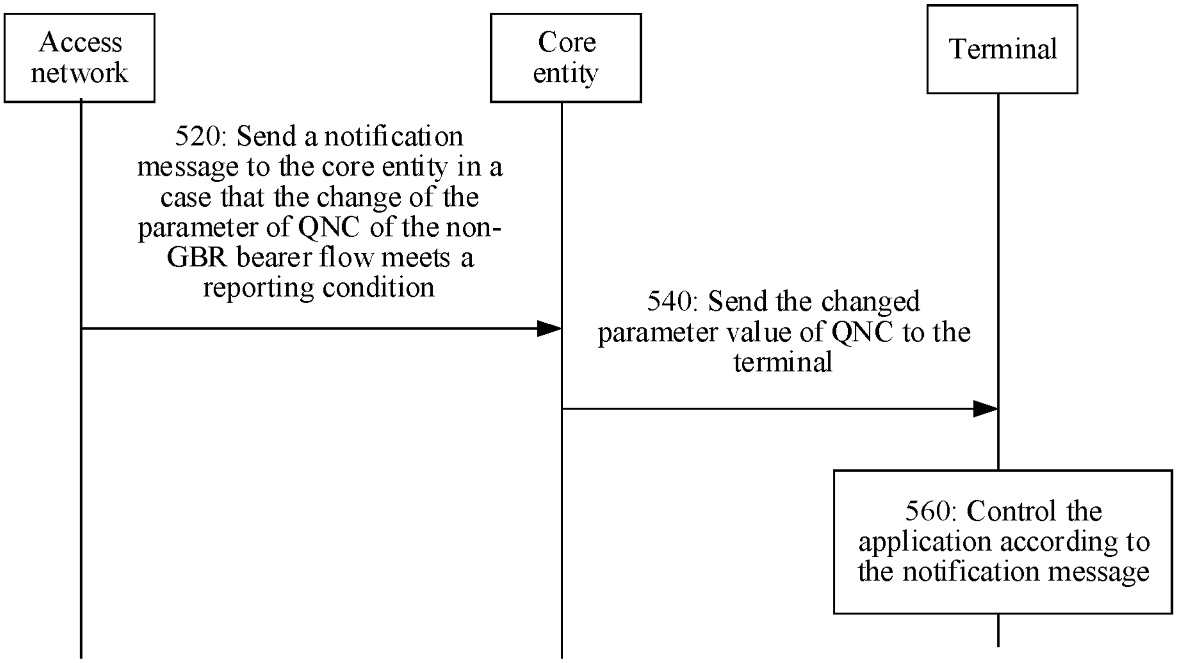
FIG. 5 shows a flowchart of a method for controlling an application according to some embodiments.

FIG. 5 is a flowchart of a method for controlling an application provided by an exemplary embodiment of the disclosure. This example embodiment is described by using an example in which the method is applied to the communication system shown in FIG. 1 or FIG. 2. The method includes:

Operation 520: Send, by an access network, a notification message to a core entity in a case that the change of the parameter of QNC of the non-GBR bearer flow meets a reporting condition; and receive, by the core entity, a notification message sent by the access network. The notification message is used for indicating that the change of the parameter of QNC of the non-GBR bearer flow meets a reporting condition.

Correspondingly, the core entity receives the notification message sent by the access network.

Operation 540: Send, by the core entity, the changed parameter value of QNC to a terminal.

One or more core entities are provided. When the notification message involves multiple core entities located between the RAN and the UE, the multiple core entities transmit the notification message in sequence, and different core entities may use different types of messages to carry the notification message. For example, core entities include: a mobility management entity (MME) and a PCF, so that a transmission path of the notification message at least includes RAN—*MME—*SGW/PGW4UE. For another example, core entities include: a first core entity AMF, a second core entity SMF and a third core entity PCF, so that a transmission path of the notification message at least includes RAN—>AMF—>SMF—>UE.

Taking a core entity which is an SMF as an example, after receiving the notification message sent by the access network, the SMF sends the changed parameter value of QNC to the UE.

Exemplarily, when the SMF does not receive new PCC rules sent by the PCF within a preset duration after receiving the notification message, the SMF sends the changed parameter value of QNC to the terminal.

Exemplarily, when the SMF receives new PCC rules sent by the PCF within a preset duration after receiving the notification message and there is no modification to a QoS profile in the new PCC rules, the SMF sends the changed parameter value of QNC to the terminal.

The changed parameter value of QNC is transparently transmitted from the core device to the terminal through a RAN.

In some embodiments, the core entity sends an NAS message to the UE, the terminal receives the NAS message sent by the core entity, and the NAS message carries the changed parameter value of QNC.

In some embodiments, the core entity sends a PDU session modification command to the terminal, the terminal receives the PDU session modification command sent by the core entity, and the PDU session modification command carries the changed parameter value of QNC.

Operation 560: Control, by the terminal, the application according to the changed parameter value of QNC.

The UE controls at least one of the computing policy and the traffic policy of the application according to the changed parameter value of QNC, so as to enable the application to adapt to the quick change of the relevant parameters of the non-GBR bearer flow.

Taking an application on a UE side of an online conference as an example, the application corresponds to 4 SDFs: a voice SDF, a video SDF, a text message SDF, and a control plane SDF. The 4 SDFs correspond to 4 non-GBR QoS flows, and a QNC mechanism is enabled for the 4 non-GBR QoS flows respectively.

A first possible implementation way:

The application is controlled to be executed according to a first computing policy in response to the changed parameter value of QNC becoming worse; and the application is controlled to be executed according to a second computing policy in response to the changed parameter value of QNC becoming better, wherein the computing duration of a same computing task under the first computing policy is shorter than the computing duration under the second computing policy.

The computing policy is a policy related to the running computing of an application. The computing policy includes but is not limited to: at least one of a selection policy of encoding and decoding modes, a selection policy of encoding and decoding models, a selection policy of encoding and decoding levels, a selection policy of compression levels, and a selection policy of neural network models.

Taking the computing policy including the selection of encoding and decoding modes as an example, the application is controlled to use a first encoding and decoding mode for encoding and decoding in response to the changed parameter value of QNC becoming worse; and the application is controlled to use a second encoding and decoding mode for encoding and decoding in response to the changed parameter value of QNC becoming better, wherein the "encoding and decoding" refers to at least one of the encoding and the decoding.

The computing duration of a same encoding and decoding task under the first encoding and decoding policy is shorter than the computing duration under the second encoding and decoding policy.

For example, when the PDR increases, although the network delay increases, the application may compensate for the deterioration of the network delay by reducing the internal computing duration, thereby still ensuring that the overall transmission delay remains unchanged or changes very little. For example, if the PDR of the non-GBR QoS flow corresponding to a video becomes worse, the encoding rate of the video is reduced so as to reduce the number and/or size of video data packets.

A second possible implementation way:

The application is controlled to be executed according to a first traffic policy in response to the changed parameter value of QNC becoming worse; and the application is controlled to be executed according to a second traffic policy in response to the changed parameter value of QNC becoming better, wherein the traffic of the first traffic policy is less than the traffic of the second traffic policy.

Exemplarily, the traffic of the application includes a voice data packet and a video data packet.

The first traffic corresponding to the voice data packet is retained and the second traffic corresponding to the video data packet is reduced in response to the changed parameter value of QNC becoming worse; and the first traffic corresponding to the voice data packet is retained and the second traffic corresponding to the video data packet is increased in response to the changed parameter value of QNC becoming better.

For example, when the PDR increases, the traffic of a first non-GBR QoS flow corresponding to a video is reduced, and the traffic of a second non-GBR QoS flow corresponding to a voice is retained, so as to occupy less radio resources as a whole, thereby improving the transmission quality of the voice data packet and reducing the interference.

This is due to the fact that in cloud-based applications (video conference, voice conference, distance education), two-way interaction of videos and voices is usually required. There are certain requirements for network transmission delay (usually, one-way transmission delay<150 ms). However, in an actual use process, due to the change of the radio network status, within a period of time (for example, within 5 seconds), the transmission delay of the radio network suddenly becomes worse, or the transmission rate suddenly decreases, causing the voices and videos to be jammed.

Relevant studies show that users are very sensitive to jammed voices, but not too sensitive to video quality changes (such as changes in resolution and clarity), and it is acceptable to temporarily turn off the videos while preserving the voices. Generally, because the transmission data of voices is smaller, the voices are not jammed frequently. However, if the voices are jammed, the user experience is very poor. In addition, even if the voice quality is reduced from the CD quality to a very low transmission rate (such as 2G voice transmission quality), as long as the voices are not jammed, the users still have an excellent use experience.

In conclusion, according to the method provided by this example embodiment, the UE adjusts the application according to the changed parameter value of QNC, so that when the relevant parameters of the non-GBR bearer flow become worse, or when the relevant parameters of the non-GBR bearer flow restore from worse to better, the UE may adjust its own internal applications to adapt to the parameter change, thereby optimizing the running of the application.

According to the method provided by this example embodiment, by changing the computing policy of the application when the relevant parameters of the non-GBR bearer flow become worse, and reducing the internal computing duration of the application to compensate for the deterioration of the network delay, the overall transmission delay may still be ensured to remain unchanged or change very little.

According to the method provided by this example embodiment, by changing the traffic policy of the application when the relevant parameters of the non-GBR bearer flow become worse, such as retaining the traffic of the voice data packet and reducing the traffic of the video data packet, it is possible to avoid jammed voices that have a great impact on the user experience, thereby improving the user experience of the users when using voice and video programs as much as possible.

In a process of creating or modifying the non-GBR bearer flow, a configuration process of QNC is performed by the core entity to the access network. That is, the core entity sends a QNC profile to the access network, and the QNC profile is used for configuring parameters of QNC and reporting conditions (or a change threshold, a quick-change threshold, a change-reporting threshold, and a quick-change reporting threshold).

Figure 6:
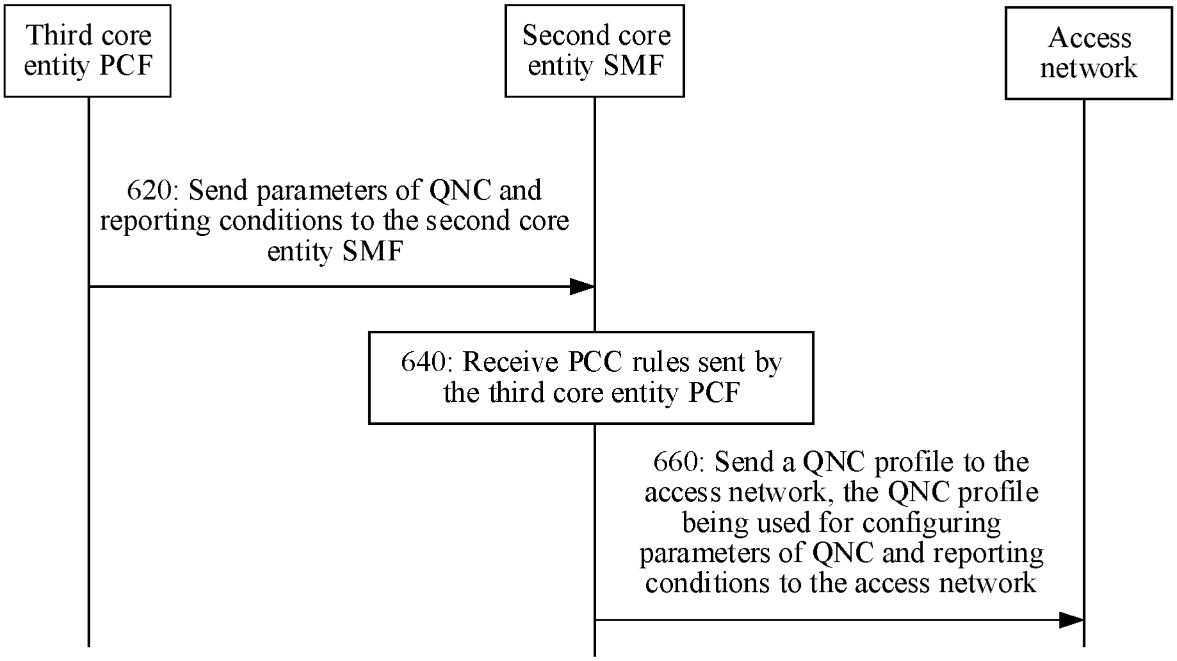
FIG. 6 shows a flowchart of a configuration method of QNC according to some embodiments.

FIG. 6 is a flowchart of a configuration method of QNC provided by an exemplary embodiment of the disclosure. This example embodiment is described by using an example in which the method is applied to the communication system shown in FIG. 1 or FIG. 2. The method includes:

Operation 620: Send, by a third core entity PCF, parameters of QNC and reporting conditions to a second core entity SMF.

The third core entity is an entity responsible for policy management in a core.

The second core entity is an entity responsible for session management in a core.

Exemplarily, in a process of creating or modifying the non-GBR bearer flow, the third core entity PCF sends parameters of QNC and reporting conditions to the second core entity SMF.

Exemplarily, in a process of creating a PDU session, a (first) QoS flow is created, and the QoS flow is called a QoS flow with default QoS rules. Generally, the QoS flow is of a non-GBR type, and the third core entity may provide parameters of QNC and reporting conditions to the second core entity.

Exemplarily, the parameters of QNC and the reporting conditions are determined by the third core entity PCF; or the parameters of QNC and the reporting conditions are determined by the third core entity PCF based on the service flow information sent by an application entity; or the parameters of QNC and the reporting conditions are determined by the third core entity PCF based on the subscription data of the UE.

Operation 640: Receive, by the second core entity SMF, PCC rules sent by the third core entity PCF.

Operation 660: Send, by the second core entity, a QNC profile to the access network, the QNC profile being used for configuring parameters of QNC and reporting conditions to the access network.

In conclusion, according to the method provided by this example embodiment, by sending the parameters of QNC and the reporting conditions by the third core entity to the second core entity, the second core entity may be triggered to configure the parameters of QNC and the reporting conditions for the non-GBR bearer flow, so as to complete the configuration process of QNC.

Figure 7:
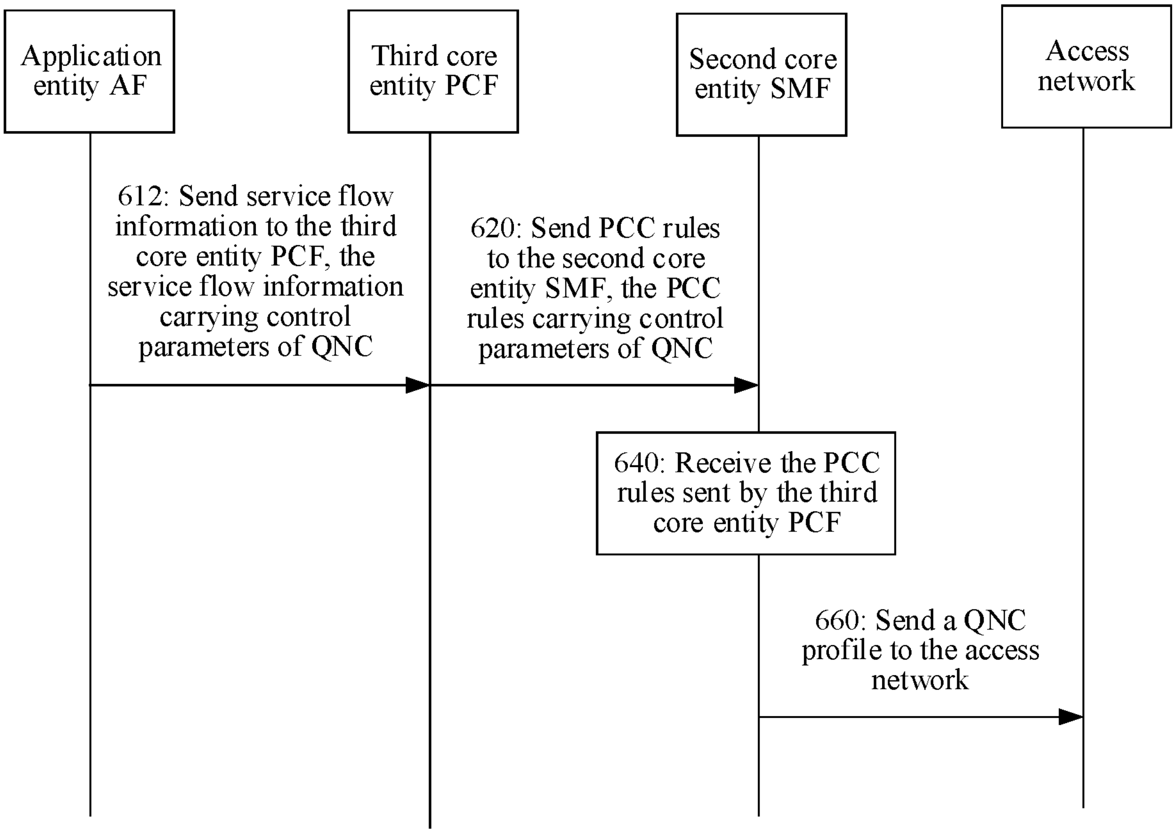
FIG. 7 shows a flowchart of a configuration method of QNC according to some embodiments.
Figure 8:
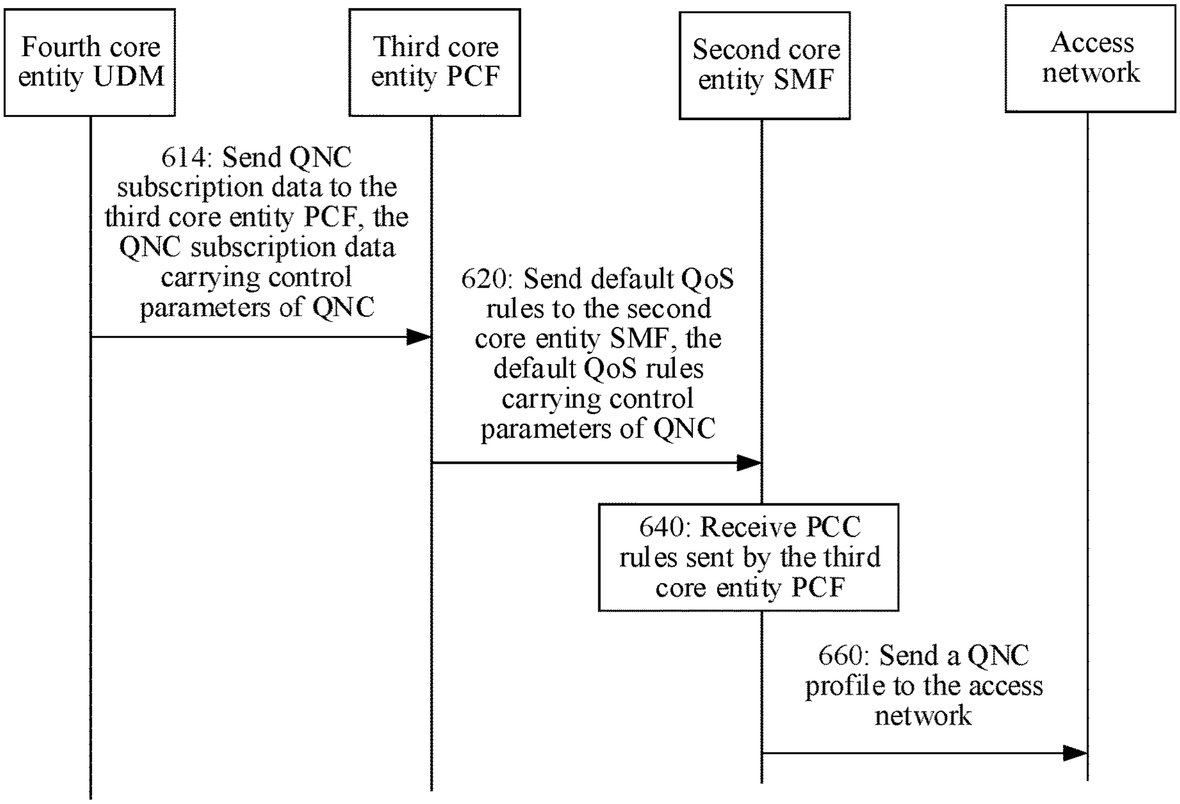
FIG. 8 shows a flowchart of a configuration method of QNC according to some embodiments.

In a design, an application entity provides service flow information to the third core entity, and the service flow information carries parameters of QNC and reporting conditions required (or suggested) by the application entity, as shown in FIG. 7. In another design, the third core entity determines parameters of QNC and reporting conditions based on QNC subscription data, as shown in FIG. 8.

FIG. 7 is a flowchart of a configuration method of QNC provided by another exemplary embodiment of the disclosure. This example embodiment is described by using an example in which the method is applied to the communication system shown in FIG. 1 or FIG. 2. The method includes:

Operation 612: Send, by an application entity AF, service flow information to the third core entity PCF, the service flow information carrying control parameters of QNC.

The control parameters of QNC include: at least one of whether to enable QNC, parameters of QNC, and a change threshold.

Operation 620: Send, by the third core entity PCF, PCC rules to the second core entity SMF, the PCC rules carrying control parameters of QNC.

Operation 640: Receive, by the second core entity SMF, the PCC rules sent by the third core entity PCF.

Operation 660: Send, by the second core entity, a QNC profile to the access network, the QNC profile being used for configuring control parameters of QNC to the access network.

In conclusion, according to the method provided by this example embodiment, by providing the control parameters of QNC by the application entity to the third core entity, the active interaction between the application entity and the core entity may be realized; The application entity drives a RAN (such as a 5G or 4G RAN) to report the quick change of the non-GBR bearer flow, so that the RAN exposes its network capabilities to the application entity, thereby providing a new way for the innovation of Internet applications.

FIG. 8 is a flowchart of a configuration method of QNC provided by another exemplary embodiment of the disclosure. This example embodiment is described by using an example in which the method is applied to the communication system shown in FIG. 1 or FIG. 2. The method includes:

Operation 614: Send, by a fourth core entity UDM, QNC subscription data to the third core entity PCF, the QNC subscription data carrying control parameters of QNC.

If the default 5QI is of an NGBR type, the QNC subscription data is added. The fourth core entity UDM sends the QNC subscription data to the second core entity SMF, and the second core entity SMF sends the QNC subscription data to the third core entity PCF.

Operation 620: Send, by the third core entity PCF, default QoS rules to the second core entity SMF, the default QoS rules carrying control parameters of QNC.

Operation 640: Receive, by the second core entity SMF, the default PCC rules sent by the third core entity PCF.

Operation 660: Send, by the second core entity, a QNC profile to the access network, the QNC profile being used for configuring control parameters of QNC to the access network.

In conclusion, according to the method provided by this example embodiment, the control parameters of QNC are determined based on the subscription data of the UE through the third core entity, so that in a case that control parameters of QNC are not provided by the AF, it is also possible to drive the RAN to report the quick change of the non-GBR bearer flow to the UE based on the subscription data of the UE.

The above-mentioned processes are described in more detail below with reference to the communication protocol (TS23.502) of the third generation partnership project (3GPP). The details of network element names, operation processes and operation introductions in the following drawings refer to relevant records in TS23.502(https://www.3gpp.org/ftp/Specs/archive/23 series/23.502). Due to the space limitation, this article focuses on introducing the contents of the embodiments of the disclosure different from the contents in the TS23.502 protocol.

1. Notification process of QNC:

When the network where the UE is located changes, that is, a base station detects that radio resources change quickly (becoming better or worse), if the change reaches a change threshold defined by QNC, the RAN triggers the notification process of QNC and sends a notification message to the AF. In some embodiments, the notification message carries the parameter value (current parameter value) of the changed parameter of QNC. The base station first sends the notification message to the SMF, then the SMF sends the notification message to the PCF, and the PCF sends the notification message to the AF.

Figure 9:
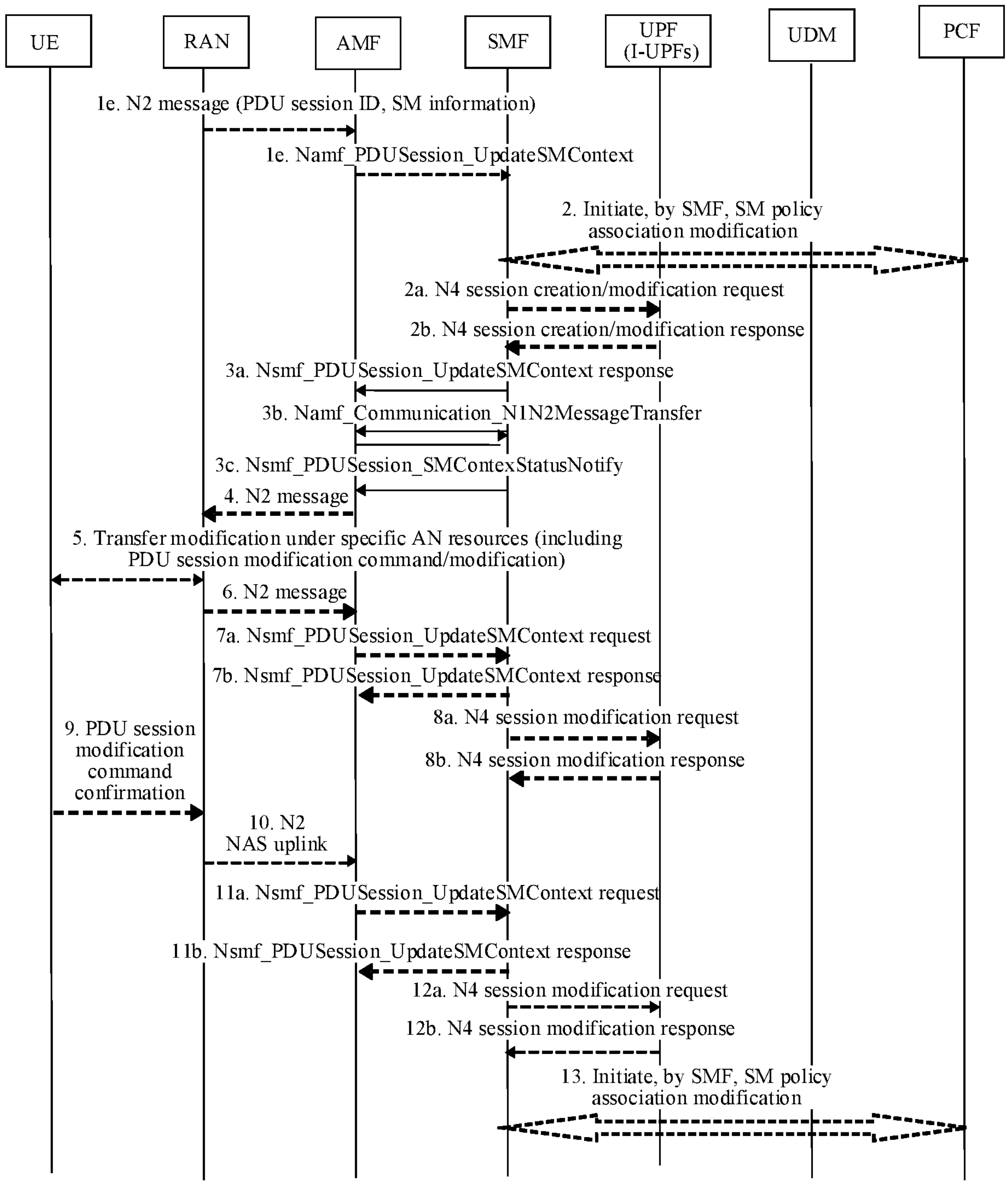
FIG. 9 shows a schematic diagram of a PDU session modification (for non-roaming and local breakout roaming) process requested by user equipment (UE) or a network according to some embodiments.

Non-roaming and local breakout roaming scenes:

FIG. 9 shows a schematic diagram of a PDU session modification (for non-roaming and local breakout roaming) process requested by UE or a network provided by an exemplary embodiment of the disclosure.

In operation le, the RAN sends an N2 message (PDU session ID, SM information) to the AMF, and the AMF sends a Namf PDUSession UpdateSMContext message to the SMF.

Operation la, operation 1*b*, operation 1*c*, operation 1*d* and operation if are not performed.

When the parameter of QNC of the non-GBR bearer flow meets a reporting condition, the two messages carry a notification message. In some embodiments, the notification message further carries the changed parameter value of QNC.

In operation 2, the SMF initiates a session management (SM) policy association modification process, and sends the notification message to the PCF and the AF.

In operation 5, the SMF sends a PDU session modification command to the UE, and sends the changed parameter value of QNC to the UE.

Exemplarily, after the SM receives the notification message for a period of time, when the SMF does not receive new PCC rules of the PCF, or the received PCC rules do not modify the QoS aspect in the PCC rules of the SDF corresponding to the QNC, the SMF initiates the PDU session modification command to the UE to notify the UE of the current parameter values (PDB, PER, CBR) of QNC of the QFI corresponding to the current QNC.

In operation 9, the UE responds with a PDU session modification confirmation.

The PDU session modification command and the PDU session modification confirmation are transparently transmitted between the UE and the SMF through the RAN.

Figure 10:
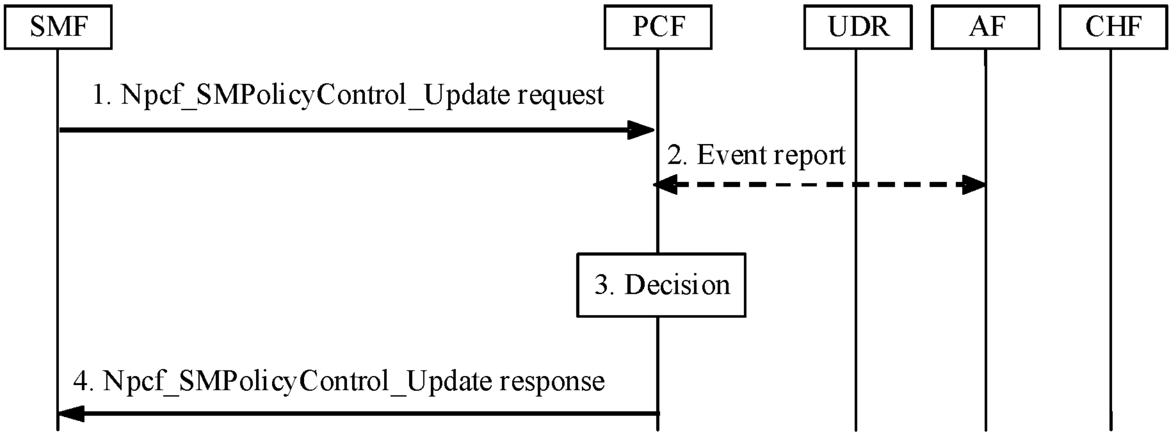
FIG. 10 shows a schematic diagram of an SM policy association modification process according to some embodiments.

The SM policy association modification process shown in operation 2 is defined by FIG. 10. As shown in FIG. 10:

In operation 1, the SMF sends an Npcf SMPolicyControl Update request to the PCF, and the request carries a notification message.

In operation 2, the PCF sends an event report Npcf PolicyAuthorizationNotify request to the AF, and the event report carries a notification message.

Figure 11:
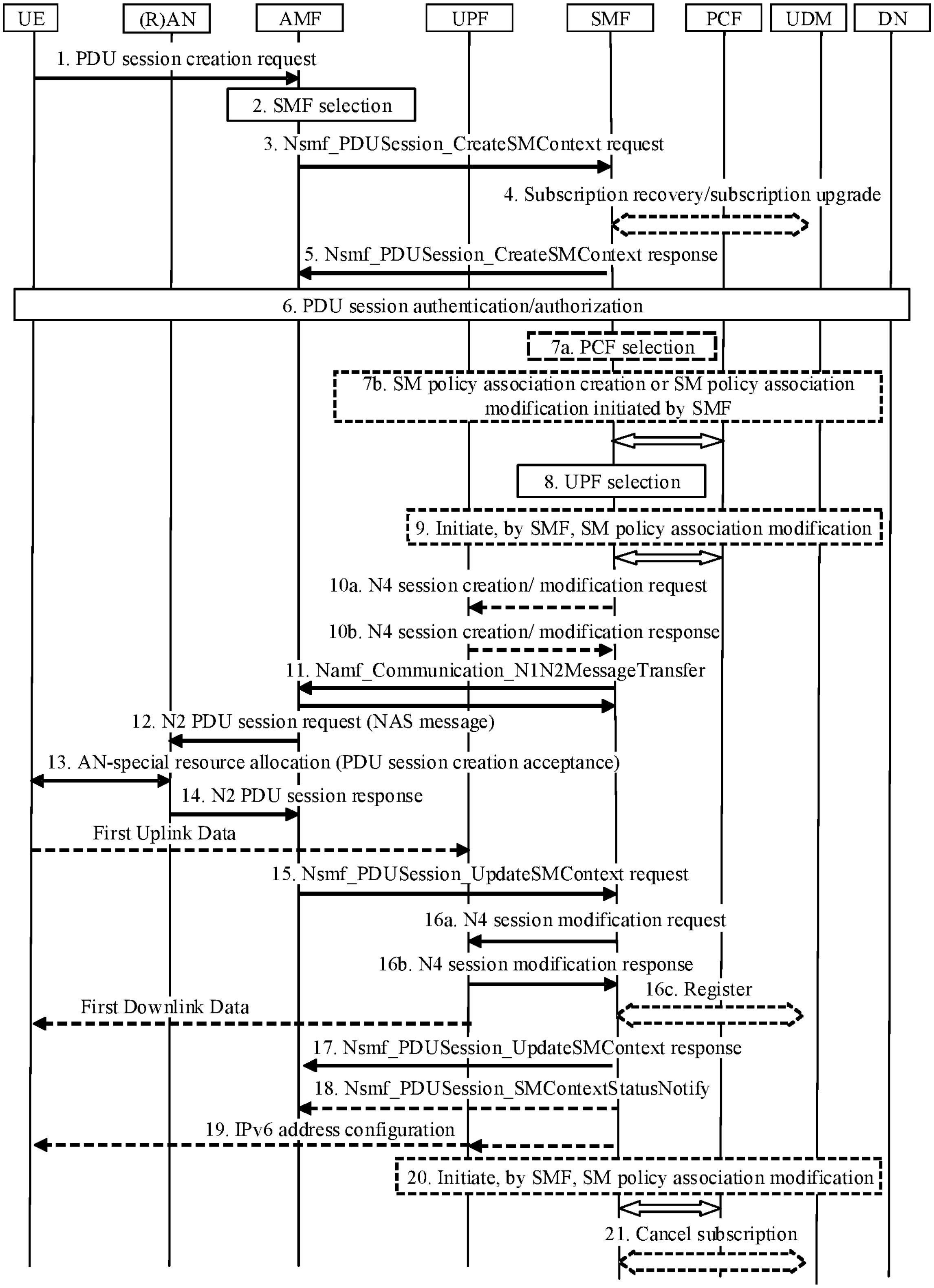
FIG. 11 shows a schematic diagram of a PDU session creation process requested by UE according to some embodiments.

2. Configuration process of QNC 2.1 PDU session creation scene for non-roaming and local breakout roaming FIG. 11 shows a schematic diagram of a PDU session creation process requested by UE provided by an exemplary embodiment of the disclosure.

In operations 7*b* and 9, the SMF sends a new SM policy association creation request message to the PCF, the PCF sends an SM policy association creation response message to the SMF, and the message carries control parameters of QNC; or the SMF sends an SM policy association modification request message to the PCF, the PCF sends an SM policy association modification response message to the SMF, and the message carries control parameters of QNC.

In a process of creating a PDU session, a QoS flow (usually the first QoS flow) is created, and the QoS flow is called a QoS flow with default QoS rules (no longer similar to the default bearer of 4G, 5G is no longer named with the default QoS flow).

Generally, the default QoS rule is of a non-GBR type, and then, the PCF may include control parameters of QNC in the PCC rules. In operation 7*b* or 9 in FIG. 11, if the 5QI in the default QoS rule provided by the PCF is of an NGBR type, the PCF may provide control parameters of QCQNC to the SMF.

In operations 11 and 12, the SMF sends a Namf Communication N1N2 information conversion message to the AMF, and the message carries a QNC profile according to the control parameters of QCQNC provided by the PCF.

In some embodiments, the subscription data of the UE includes a default 5QI and a default ARP. If the default 5QI is of an NGBR type, QNC subscription data is added.

In operations 4, 7*b* and 9, the UDM provides a message including the QNC subscription data to the SMF, then the SMF provides the QNC subscription data to the PCF, and then the default QoS rules provided by the PCF include the control parameters of QNC.

The PDU session creation process may be used for PDU session handover from N3GPP to 3GPP. If in operation 7*b* or 9, the PCF provides control parameters of QNC for any non-GBR QoS flow, similar to the above, the control parameters of QNC are added in operations 11 and 12.

There may be processing of multiple non-GBR QoS flows here.

The SM-related parameters in the N2 message in operation 12 are included in operation 11, so the control parameters of QNC are included in operation 11.

Figure 12:
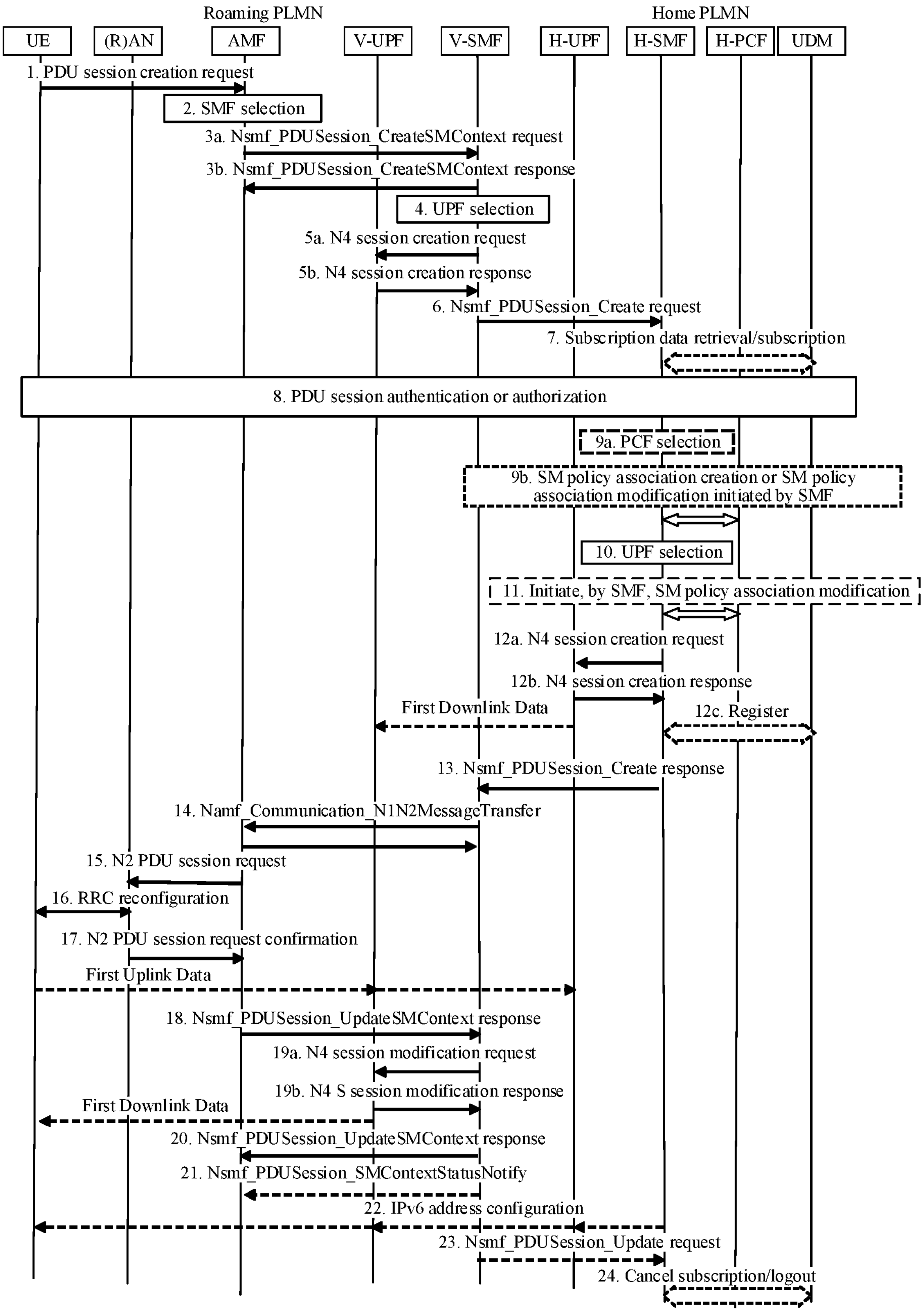
FIG. 12 shows a flowchart of a PDU session creation process requested by UE for a home routing roaming scene according to some embodiments.

2.2 Home routing roaming scene:

FIG. 12 shows a flowchart of a PDU session creation process requested by UE for a home routing roaming scene provided by an exemplary embodiment of the disclosure.

In a process of creating a PDU session, a QoS flow (usually the first QoS flow) is created, and the QoS flow is called a QoS flow with default QoS rules (no longer similar to the default bearer of 4G, 5G is no longer named with the default QoS flow).

Generally, the default QoS rule is of a non-GBR type, and then, the PCF may include control parameters of QNC in the PCC rules. In the message of operation 9*b* or 11 in FIG. 12, if the 5QI in the default QoS rule provided by the PCF is of a non-GBR type, the PCF may provide control parameters of QNC. Then, QNC profiles are added to the messages in operations 13, 14 and 15.

In some embodiments, the subscription data of the UE includes a default 5QI and a default ARP. If the default 5QI is of an NGBR type, QNC subscription data is added.

In operations 7, 9*b* and 11, the UDM provides a message including the QNC subscription data to the SMF, then the SMF provides the QNC subscription data to the PCF, and then the default QoS rules provided by the PCF include the control parameters of QNC.

Figure 13:
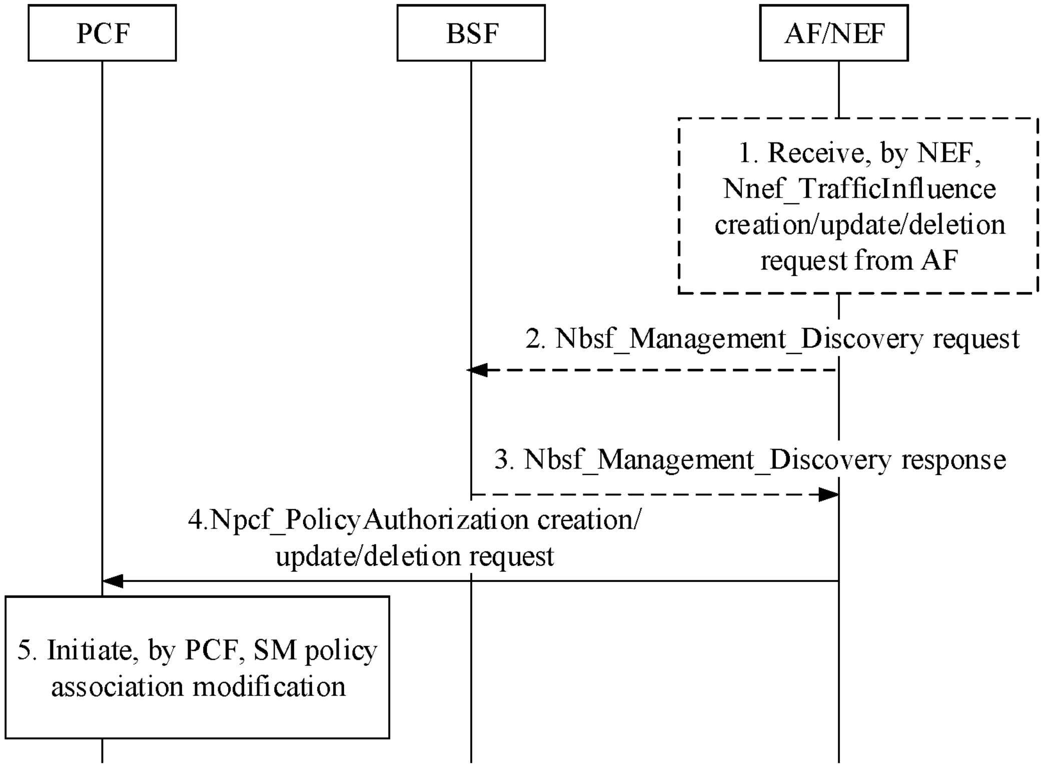
FIG. 13 shows a schematic diagram of a process of transferring an application function (AF) request for a single UE address to a related policy control function (PCF) according to some embodiments.
Figure 14:
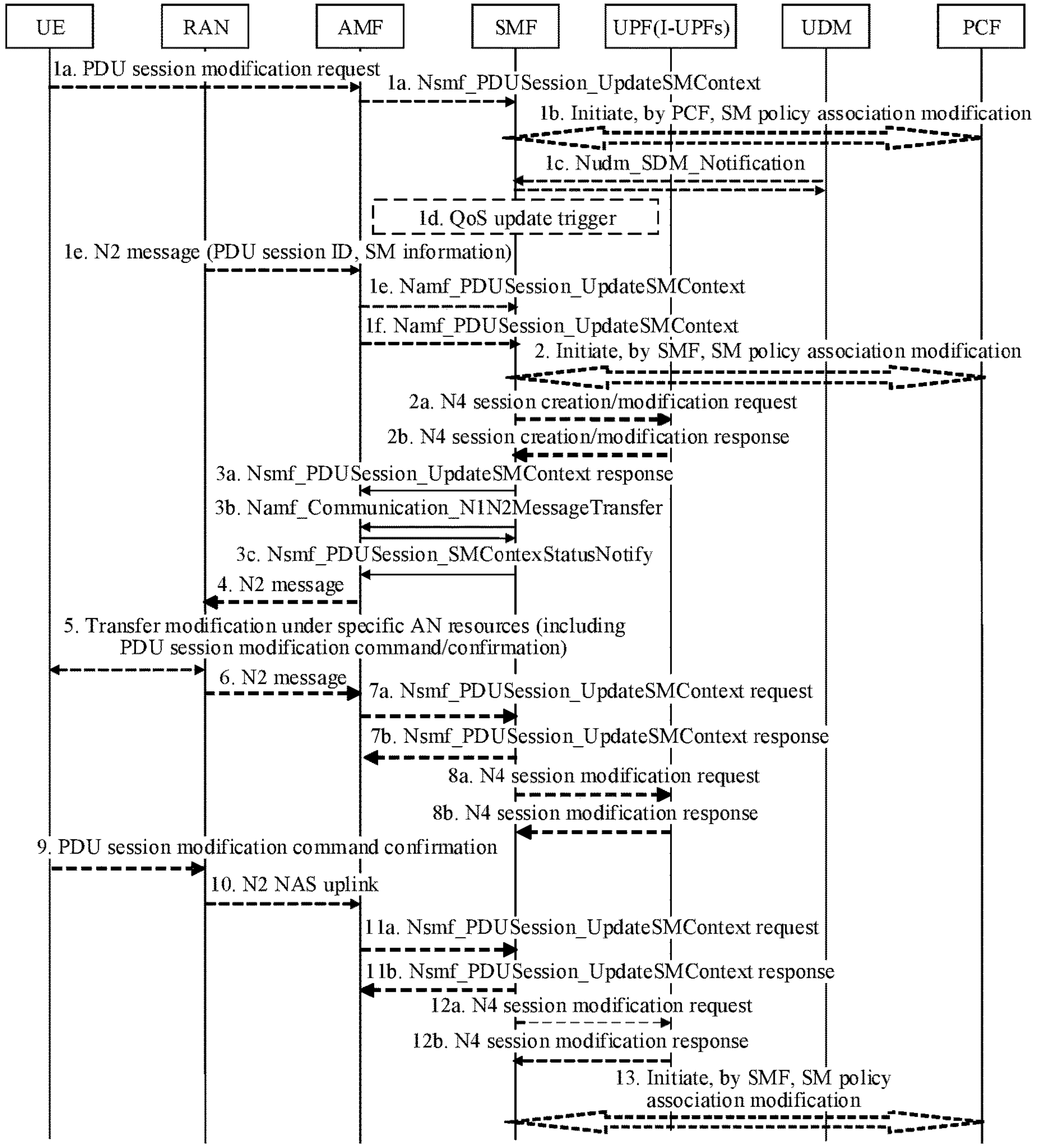
FIG. 14 shows a schematic diagram of a PDU session modification process requested by UE or a network for non-roaming and local breakout roaming according to some embodiments.

2.3 QoS flow creation process triggered by AF, non-roaming and local breakout roaming scenes:

FIG. 13 shows a schematic diagram of a process of transferring an AF request for a single UE address to a related PCF provided by an exemplary embodiment of the disclosure. FIG. 14 shows a schematic diagram of a PDU session modification process requested by UE or a network for non-roaming and local breakout roaming provided by an exemplary embodiment of the disclosure.

In operation 4 in FIG. 13, the AF sends a Npcf PolicyAuthorization Create/Update message to the PCF, and control parameters of QNC are added to (one or more) media component information included in the message. As mentioned above, if the media component includes the control parameters of QNC, the media is requested to be transmitted on the NGBF; and if QCQNC parameters are not included in the media component, it indicates that the media may be transmitted on the NGBF or on the GBF.

In operation 1*b* in FIG. 14, the PCF sends a Npcf SMPolicyControlUpdateNotify request message. In the request message, control parameters of QNC are added to the PCC rules of (one or more) SDFs (one SDF corresponds to a media flow provided by the AF).

Correspondingly, the messages in operations 3*b* and 4 in FIG. 14 carry the control parameters of QNC.

Figure 15:
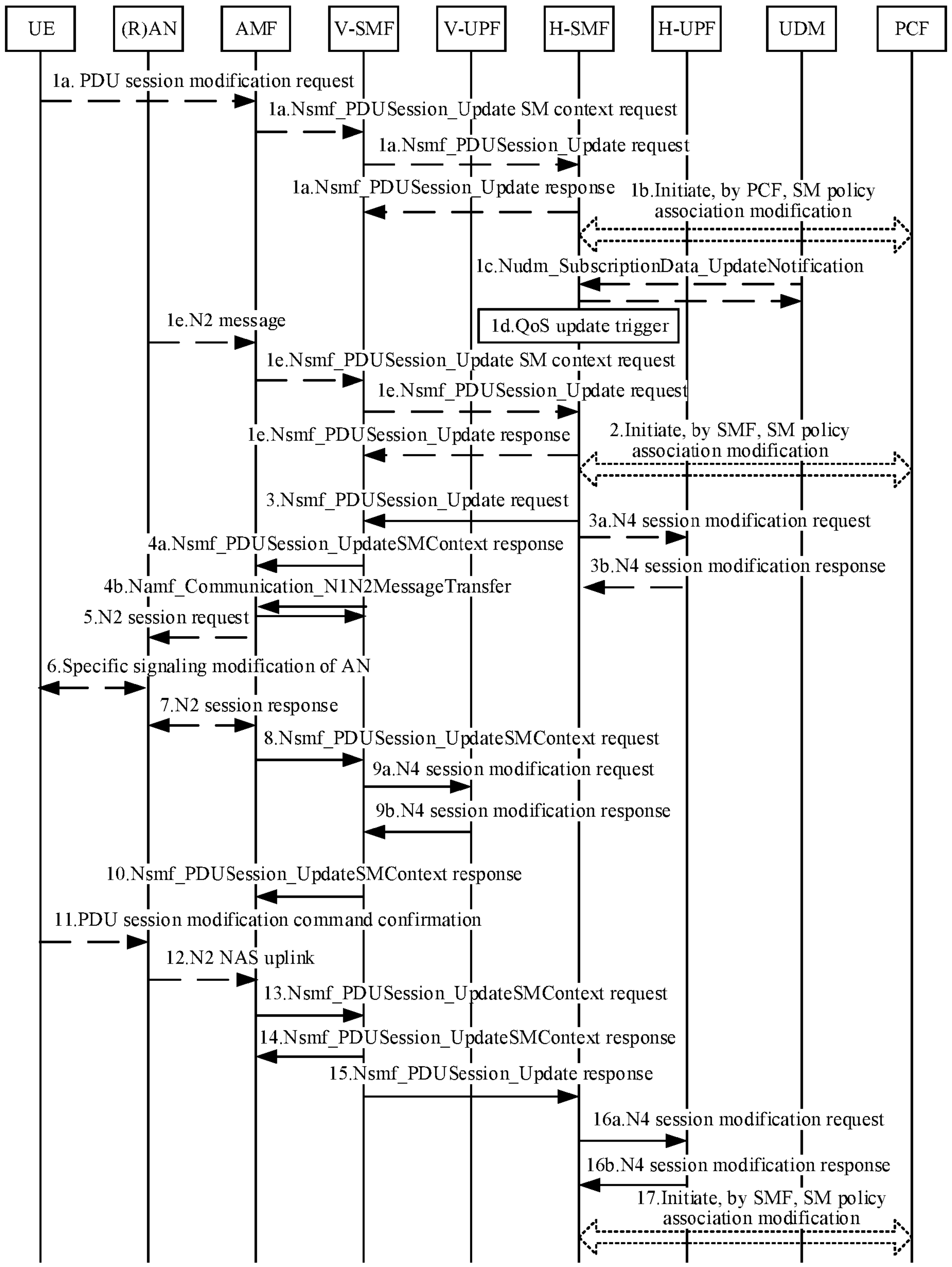
FIG. 15 shows a schematic diagram of a PDU session modification process requested by UE or a network for home routing roaming according to some embodiments.

2.4 QoS flow creation process triggered by AF, home routing roaming scene:

FIG. 15 shows a schematic diagram of a PDU session modification process requested by UE or a network for home routing roaming provided by an exemplary embodiment of the disclosure.

In operation 1*b*, operation 3, operation 4*b* and operation 5 in FIG. 15, one or more control parameters of QNC (that is, each of possible service flows, SDFs, and QoS flows) are added.

Operation 3 in FIG. 15 is a new operation relative to the scene described in FIG. 14, that is, control parameters of QNC are added to the QoS parameters of one or more QoS flows.

The technology proposed in the disclosure may also be applied to a 4G system. When the technology is applied to the 4G system, an NR-gNB is replaced with an eNB. The interaction between a PCF and an AF is not changed. The interaction between an SMF and a PCF is modified to the interaction between a PGW and a PCF. A QoS flow of the 5G is replaced with an EPS Bearer of the 4G. A 5QI of the 5G is replaced with a QCI of the 4G. The interaction between a RAN and an AMF/SMF in the 5G is replaced with the interaction between a RAN and an MME in the 4G.

Figure 16:
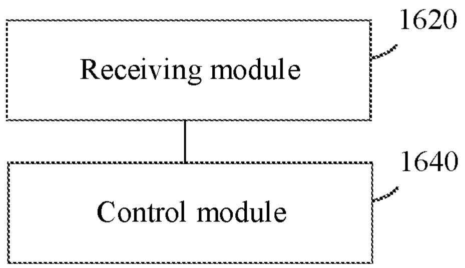
FIG. 16 shows an apparatus for controlling an application according to some embodiments.

FIG. 16 shows a block diagram of an apparatus for controlling an application provided by an exemplary embodiment of the disclosure. the apparatus includes:

a receiving module 1620 configured to receive a changed parameter value of QNC of a non-GBR bearer flow sent by a core entity, wherein the changed parameter value of QNC is sent after the core entity receives a notification message sent by an access network, and the notification message is used for indicating that the change of the parameter value of QNC of the non-GBR bearer flow meets a reporting condition; and a control module 1640 configured to control the application according to the changed parameter value of QNC.

In a possible design of the embodiments of the disclosure, the control module 1640 is used for the terminal to control a computing policy of the application according to the changed parameter value of QNC; and/or control a traffic policy of the application according to the changed parameter value of QNC.

In a possible design of the embodiments of the disclosure, the control module 1640 is configured to control the application to be executed according to a first computing policy in response to the changed parameter value of QNC becoming worse; and control the application to be executed according to a second computing policy in response to the changed parameter value of QNC becoming better, wherein the computing duration of a same computing task under the first computing policy is shorter than the computing duration under the second computing policy.

In a possible design of the embodiments of the disclosure, the control module 1640 is configured to control the application to use a first encoding and decoding mode for encoding and decoding in response to the changed parameter value of QNC becoming worse; and control the application to use a second encoding and decoding mode for encoding and decoding in response to the changed parameter value of QNC becoming better, wherein the computing duration of a same encoding and decoding task under the first encoding and decoding policy is shorter than the computing duration under the second encoding and decoding policy.

In a possible design of the embodiments of the disclosure, the control module 1640 is configured to control the application to be executed according to a first traffic policy in response to the changed parameter value of QNC becoming worse; and control the application to be executed according to a second traffic policy in response to the changed parameter value of QNC becoming better, wherein the traffic of the first traffic policy is less than the traffic of the second traffic policy.

In a possible design of the embodiments of the disclosure, the traffic of the application includes a voice data packet and a video data packet; the control module 1640 is configured to retain the first traffic corresponding to the voice data packet and reduce the second traffic corresponding to the video data packet in response to the changed parameter value of QNC becoming worse; and retain the first traffic corresponding to the voice data packet and increase the second traffic corresponding to the video data packet in response to the changed parameter value of QNC becoming better.

In a possible design of the embodiments of the disclosure, the receiving module 1620 is configured to receive an NAS message sent by the core entity, the NAS message carrying the changed parameter value of QNC.

In a possible design of the embodiments of the disclosure, the receiving module 1620 is configured to receive a PDU session modification command sent by the core entity, the PDU session modification command carrying the changed parameter value of QNC.

In a possible design of the embodiments of the disclosure, the changed parameter value of QNC is sent in a case that the core device does not receive new PCC rules for the non-GBR bearer flow within a preset duration after receiving the notification message; or the changed parameter value of QNC is sent in a case that the core device receives new PCC rules for the non-GBR bearer flow within a preset duration after receiving the notification message and there is no modification to QoS requirements in the new PCC rules.

In a possible design of the embodiments of the disclosure, the changed parameter value of QNC is transparently transmitted from the core device to the terminal through a radio access network (RAN).

In a possible design of the embodiments of the disclosure, the parameter value of QNC includes at least one of the following: PDR; PER; and CBR.

In a possible design of the embodiments of the disclosure, there are at least two of the parameter values of QNC; the reporting conditions corresponding to at least two of the parameter values are the same; and/or the reporting conditions corresponding to at least two of the parameter values are different.

In a possible design of the embodiments of the disclosure, the reporting condition includes at least one of the following:

the changing value of the parameter value of QNC within a first duration is greater than a first threshold;

the changing rate of the parameter value of QNC within a second duration is greater than a second threshold;

the changing value of the parameter value of QNC within the first duration is greater than the first threshold, and a third threshold is retained continuously; and the changing rate of the parameter value of QNC within the second duration is greater than the second threshold, and a fourth threshold is retained continuously, wherein the third threshold and the fourth threshold are thresholds for measuring a retaining duration. In some embodiments, the third threshold is a threshold for measuring a retaining duration of the changing value, and the fourth threshold is a threshold for measuring a retaining duration of the changing rate.

In a possible design of the embodiments of the disclosure, the non-GBR bearer flow includes:

a non-GBR QoS flow; or a non-GBR EPS bearer.

In a possible design of the embodiments of the disclosure, the QNC is defined in an uplink; or the QNC is defined in a downlink; or the QNC is defined in the uplink and the downlink.

In a possible design of the embodiments of the disclosure, there is a one-to-one correspondence relationship between the non-GBR bearer flow and a target service flow, and the target service flow is a service flow that enables the QNC and includes parameter values of the QNC.

Figure 17:
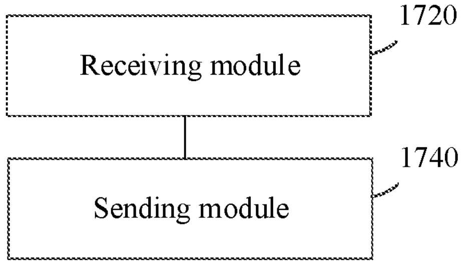
FIG. 17 shows an apparatus for controlling an application according to some embodiments.

FIG. 17 shows a block diagram of an apparatus for controlling an application provided by an exemplary embodiment of the disclosure. the apparatus includes:

a receiving module 1720 configured to receive a notification message sent by an access network, the notification message being used for indicating that the change of the parameter value of QNC of the non-GBR bearer flow meets a reporting condition, and the notification message carrying the changed parameter value of QNC of the non-GBR bearer flow; and a sending module 1740 configured to send the changed parameter value of QNC to a terminal, so that the terminal controls the application according to the changed parameter value of QNC.

In a possible design of the embodiments of the disclosure, the sending module 1740 is configured to send an NAS message to the terminal, the NAS message carrying the changed parameter value of QNC.

In a possible design of the embodiments of the disclosure, the sending module 1740 is configured to send a PDU session modification command to the terminal, the PDU session modification command carrying the changed parameter value of QNC.

In a possible design of the embodiments of the disclosure, the sending module 1740 is configured to send the changed parameter value of QNC to the terminal in a case that new PCC rules for the non-GBR bearer flow are not received within a preset duration after the notification message is received; or the sending module 1740 is configured to send the changed parameter value of QNC to the terminal in a case that new PCC rules for the non-GBR bearer flow are received within a preset duration after the notification message is received and there is no modification to QoS requirements in the new PCC rules.

Figure 18:
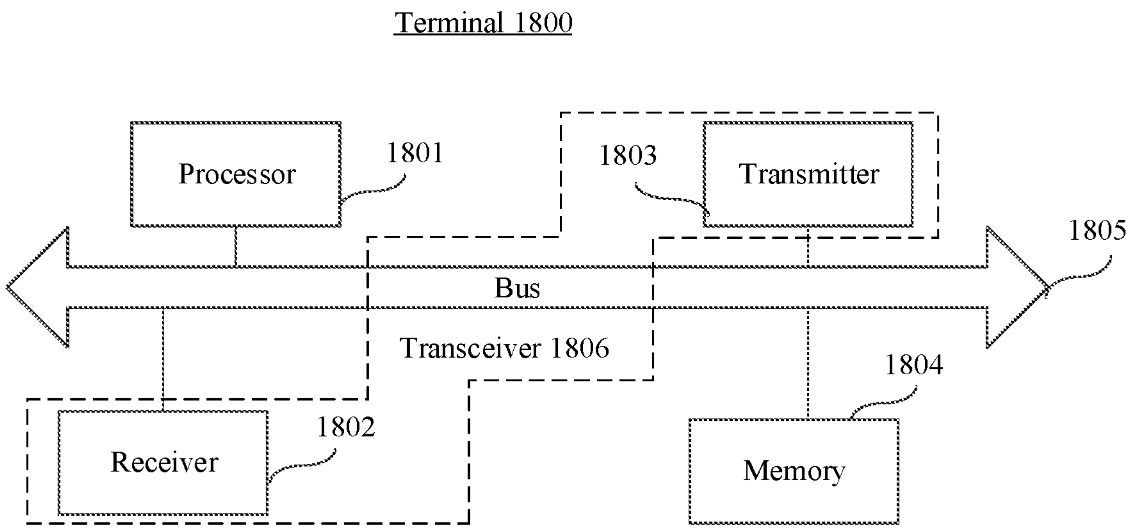
FIG. 18 shows a block diagram of a terminal according to some embodiments.

FIG. 18 shows a schematic structural diagram of a terminal 1800 provided by an example embodiment of the disclosure. For example, the terminal may be configured to perform the above-mentioned method for controlling an application. The terminal 1800 may include: a processor 1801, a receiver 1802, a transmitter 1803, a memory 1804 and a bus 1805.

The processor 1801 includes one or more processing cores, and the processor 1801 performs various functional applications and information processing by running a software program and module.

The receiver 1802 and the transmitter 1803 may be implemented as a transceiver 1806, which may be a communication chip.

The memory 1804 is connected to the processor 1801 through the bus 1805.

The memory 1804 may be configured to store computer programs, and the processor 1801 is configured to execute the computer programs to implement each of the operations performed by the terminal in the above-mentioned method embodiments.

The transmitter 1803 is configured to perform the operations related to sending in each of the above-mentioned embodiments; the receiver 1802 is configured to perform the operations related to receiving in each of the above-mentioned embodiments; and the processor 1801 is configured to perform other operations except the sending and receiving operations in each of the above-mentioned embodiments.

In addition, the memory 1804 may be implemented by any type of volatile or non-volatile storage device or a combination thereof. The volatile or non-volatile storage device includes, but not limited to: a RAM, a ROM, an erasable programmable ROM (EPROM), an electrically erasable programmable ROM (EEPROM), a flash memory or another solid-state memory technology, a CD- ROM, a digital versatile disc (DVD) or another optical memory, a tape cartridge, a magnetic cassette, a magnetic disk memory, or another magnetic storage device.

Figure 19:
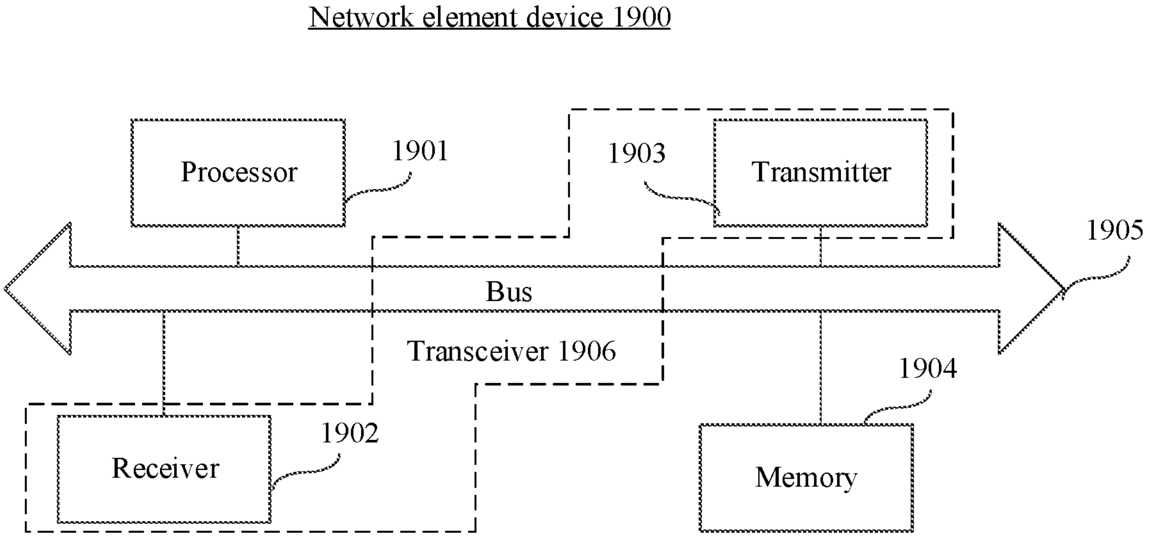
FIG. 19 shows a block diagram of a network element device according to some embodiments.

FIG. 19 shows a schematic structural diagram of a network element device 1900 provided by an example embodiment of the disclosure. For example, the network element device may be configured to perform the above-mentioned method for controlling an application. The network element device 1900 may include: a processor 1901, a receiver 1902, a transmitter 1903, a memory 1904 and a bus 1905.

The processor 1901 includes one or more processing cores, and the processor 1901 performs various functional applications and information processing by running a software program and module.

The receiver 1902 and the transmitter 1903 may be implemented as a transceiver 1906, which may be a communication chip.

The memory 1904 is connected to the processor 1901 through the bus 1905.

The memory 1904 may be configured to store computer programs, and the processor 1901 is configured to execute the computer programs to implement each of the operations performed by an access network element, an access network entity, a core element or a core entity in the above-mentioned method embodiments.

The transmitter 1903 is configured to perform the operations related to sending in each of the above-mentioned embodiments; the receiver 1902 is configured to perform the operations related to receiving in each of the above-mentioned embodiments; and the processor 1901 is configured to perform other operations except the sending and receiving operations in each of the above-mentioned embodiments.

In addition, the memory 1904 may be implemented by any type of volatile or non-volatile storage device or a combination thereof. The volatile or non-volatile storage device includes, but not limited to: a RAM, a ROM, an erasable programmable ROM (EPROM), an electrically erasable programmable ROM (EEPROM), a flash memory or another solid-state memory technology, a CD- ROM, a digital versatile disc (DVD) or another optical memory, a tape cartridge, a magnetic cassette, a magnetic disk memory, or another magnetic storage device.

The disclosure further provides a computer-readable storage medium, the storage medium storing at least one instruction, at least one program, a code set or an instruction set, and the at least one instruction, the at least one program, the code set or the instruction set being loaded and executed by a processor to implement the application program control method according to the foregoing method embodiments.

In some embodiments, the disclosure further provides a computer program product, the computer program product including computer instructions, the computer instructions being stored in a computer-readable storage medium. A processor of a computer device reads the computer instructions from the computer-readable storage medium and executes the computer instructions to cause the computer device to perform the application program control method according to the foregoing aspects.

What is disclosed above is merely exemplary embodiments of the disclosure, and certainly is not intended to limit the protection scope of the disclosure. Therefore, equivalent variations made in accordance with the claims of the disclosure shall fall within the scope of the disclosure

What is claimed is:

1. A method for controlling an application, the method comprising:

receiving, by a user equipment (UE) terminal based on whether a core device receives a new policy or whether a new policy charging control (PCC) rule is received, a changed parameter value of quality of service (QOS) notification control (QNC) of a non-guaranteed bit rate (GBR) bearer flow from a core entity; and controlling, by the UE terminal, the application according to the changed parameter value of QNC, wherein the controlling the application according to the changed parameter value QNC comprises:

controlling, by the UE terminal, a computing policy of the application according to the changed parameter value of QNC, the controlling the computing policy of the application according to the changed parameter value of QNC comprising:

controlling the application to be executed according to a first computing policy based on the changed parameter value of QNC becoming worse; and controlling the application to be executed according to a second computing policy based on the changed parameter value of QNC becoming better, and controlling, by the UE terminal, a traffic policy of the application according to the changed parameter value of QNC, wherein the core entity is a session management function (SMF), wherein the changed parameter value is received in a non-access stratum (NAS) message, and wherein a computing duration of a same computing task under the first computing policy is shorter than a computing duration under the second computing policy.

2. The method according to claim 1, wherein the controlling the application to be executed according to a first computing policy in response to the changed parameter value of QNC becoming worse comprises:

controlling the application to use a first encoding and decoding mode for encoding and decoding based on the changed parameter value of QNC becoming worse; and the controlling the application to be executed according to a second computing policy based on the changed parameter value of QNC becoming better comprises:

controlling the application to use a second encoding and decoding mode for encoding and decoding based on the changed parameter value of QNC becoming better;

wherein the computing duration of a same encoding and decoding task under the first encoding and decoding policy is shorter than the computing duration under the second encoding and decoding policy.

3. The method according to claim 1, wherein the controlling a traffic policy of the application according to the changed parameter value of QNC comprises:

controlling the application to be executed according to a first traffic policy based on the changed parameter value of QNC becoming worse; and controlling the application to be executed according to a second traffic policy based on the changed parameter value of QNC becoming better, wherein the traffic of the first traffic policy is less than the traffic of the second traffic policy.

4. The method according to claim 3, wherein the traffic of the application comprises a voice data packet and a video data packet;

the controlling the application to be executed according to a first traffic policy based on the changed parameter value of QNC becoming worse comprises:

retaining the first traffic corresponding to the voice data packet and reducing the second traffic corresponding to the video data packet based on the changed parameter value of QNC becoming worse; and the controlling the application to be executed according to a second traffic policy based on the changed parameter value of QNC becoming better comprises:

retaining the first traffic corresponding to the voice data packet and increasing the second traffic corresponding to the video data packet based on the changed parameter value of QNC becoming better.

5. The method according to claim 1, further comprising:

receiving, by the UE terminal, a protocol data unit (PDU) session modification command from the core entity, the PDU session modification command including the changed parameter value of QNC.

6. The method according to claim 1, wherein the changed parameter value of QNC is received when a core device receives new PCC rules for the non- GBR bearer flow within a preset duration after receiving the notification message and there is no modification to QoS requirements in the new PCC rules.

7. The method according to claim 1, wherein the changed parameter value of QNC is transparently received from the core device through a radio access network (RAN).

8. The method according to claim 1, wherein the parameter value of QNC comprises at least one of:

a packet delay budget (PDR);

a packet error rate (PER); or a current bit rate (CBR).

9. The method according to claim 8, wherein there are at least two of the parameter values of QNC;

the reporting conditions corresponding to at least two of the parameter values are the same;

and/or the reporting conditions corresponding to at least two of the parameter values are different.

10. The method according to claim 9, wherein the reporting condition comprises at least one of:

the changing value of the parameter value of QNC within a first duration is greater than a first threshold;

the changing rate of the parameter value of QNC within a second duration is greater than a second threshold;

the changing value of the parameter value of QNC within the first duration is greater than the first threshold, and a third threshold is retained continuously; or the changing rate of the parameter value of QNC within the second duration is greater than the second threshold, and a fourth threshold is retained continuously, wherein the third threshold and the fourth threshold are thresholds for measuring a retaining duration.

11. The method according to claim 1, wherein the non-GBR bearer flow comprises:

a non-GBR QOS flow;

or a non-GBR evolved packet system (EPS) bearer.

12. The method according to claim 1, wherein the QNC is defined in an uplink;

or the QNC is defined in a downlink;

or the QNC is defined in the uplink and the downlink.

13. The method according to claim 1, wherein:

there is a one-to-one correspondence relationship between the non-GBR bearer flow and a target service flow, and the target service flow is a service flow that enables the QNC and comprises parameter values of the QNC.

14. A user equipment (UE) terminal for controlling an application, the apparatus comprising:

at least one memory configured to store program code; and at least one processor configured to read the program code and operate as instructed by the program code, the program code comprising:

receiving code configured cause the at least one processor to receive, based on whether a core device receives a new policy or whether a new charging (PCC) rule is received, a changed parameter value of QNC of a non-GBR bearer flow from a core entity; and control code configured to cause the at least one processor to control the application according to the changed parameter value of QNC that includes:

controlling, by the UE terminal, a computing policy of the application according to the changed parameter value of QNC by:

controlling the application to be executed according to a first computing policy based on the changed parameter value of QNC becoming worse; and controlling the application to be executed according to a second computing policy based on the changed parameter value of QNC becoming better, and, controlling, by the UE terminal, a traffic policy of the application according to the changed parameter value of QNC, wherein the core entity is a session management function (SMF), and wherein the changed parameter value is received in a non-access stratum (NAS) message, and wherein a computing duration of a same computing task under the first computing policy is shorter than a computing duration under the second computing policy.

15. A non-transitory computer-readable storage medium, storing a computer program that when executed by at least one processor causes the at least one processor to:

receive, by a user equipment (UE) terminal based on whether a core device receives a new policy or whether a new PCC rule is received, a changed parameter value of quality of service (QOS) notification control (QNC) of a non-guaranteed bit rate (GBR) bearer flow from a core entity; and control, by the (UE) terminal, an application according to the changed parameter value of QNC that includes:

controlling, by the UE terminal, a computing policy of the application according to the changed parameter value of QNC by:

controlling the application to be executed according to a first computing policy based on the changed parameter value of QNC becoming worse; and controlling the application to be executed according to a second computing policy based on the changed parameter value of QNC becoming better, controlling, by the UE terminal, a traffic policy of the application according to the changed parameter value of QNC, wherein the core entity is a session management function (SMF), wherein the changed parameter value is received in a non-access stratum (NAS) message, and wherein a computing duration of a same computing task under the first computing policy is shorter than a computing duration under the second computing policy.

* * * * *